(12) United States Patent
Ogura et al.

(10) Patent No.: US 8,703,845 B2
(45) Date of Patent: Apr. 22, 2014

(54) CURABLE RESIN COMPOSITION, CURED PRODUCT THEREOF, PHENOLIC RESIN, EPOXY RESIN, AND SEMICONDUCTOR SEALING MATERIAL

(75) Inventors: Ichirou Ogura, Ichihara (JP); Yoshiyuki Takahashi, Ichihara (JP); Norio Nagae, Ichihara (JP); Yousuke Hirota, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/822,453

(22) PCT Filed: Sep. 27, 2011

(86) PCT No.: PCT/JP2011/072081
§ 371 (c)(1),
(2), (4) Date: May 17, 2013

(87) PCT Pub. No.: WO2012/043563
PCT Pub. Date: Apr. 5, 2012

(65) Prior Publication Data
US 2013/0237639 A1    Sep. 12, 2013

(30) Foreign Application Priority Data
Sep. 29, 2010  (JP) ................................ 2010-218777

(51) Int. Cl.
C08G 59/32  (2006.01)
C08G 59/62  (2006.01)
C08G 59/06  (2006.01)
C08G 61/02  (2006.01)
C08L 63/00  (2006.01)
H01L 21/56  (2006.01)

(52) U.S. Cl.
USPC ........... 523/436; 523/400; 528/106; 528/212; 528/218; 528/219; 528/421

(58) Field of Classification Search
USPC .............. 523/400, 436; 528/86, 87, 212, 218, 528/219, 421, 106
See application file for complete search history.

(56) References Cited

U.S. PATENT DOCUMENTS

2008/0255315 A1   10/2008  Ogura et al.
2009/0054585 A1*   2/2009  Ogura et al. .................. 524/541
2009/0069490 A1    3/2009  Ogura et al.

FOREIGN PATENT DOCUMENTS

| JP | 2006-097004 A |   | 4/2006  |           |
|----|---------------|---|---------|-----------|
| JP | 2006/117761 A |   | 5/2006  |           |
| JP | 2006-307162 A |   | 11/2006 |           |
| JP | 2006335797 A  | * | 12/2006 | C08G 59/24 |
| JP | 2006335798 A  | * | 12/2006 | C08G 59/62 |
| JP | 2007-023213 A |   | 2/2007  |           |
| JP | 2009-286944 A |   | 12/2009 |           |
| JP | 2009-286949 A |   | 12/2009 |           |
| WO | WO-2008/041749 A1 | | 4/2008 |           |

OTHER PUBLICATIONS

Machine translation of JP 2006335797 A, provided by the JPO website (no date).*
Machine translation of JP 2006335798 A, provided by the JPO website (no date).*
International Search Report dated Jan. 17, 2012, issued for PCT/JP2011/072081.

* cited by examiner

Primary Examiner — Michael J Feely
(74) Attorney, Agent, or Firm — Edwards Wildman Palmer LLP; James E. Armstrong, IV

(57) ABSTRACT

A high degree of resistance to moisture and solder and high flame retardancy are realized without incorporating a halogen in view of environmental friendliness. A phenolic resin has structural moieties which are a naphthylmethyloxy group- or anthrylmethyloxy group-containing aromatic hydrocarbon group (ph1), a phenolic hydroxyl group-containing aromatic hydrocarbon group (ph2), and a divalent aralkyl group (X) represented by general formula (1) below:

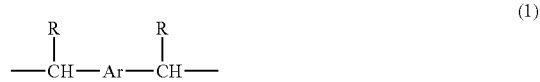

(where Ar represents a phenylene group or a biphenylene group and Rs each independently represent a hydrogen atom or a methyl group) and has a structure in which plural aromatic hydrocarbon groups selected from the group consisting of the naphthylmethyloxy group- or anthrylmethyloxy group-containing aromatic hydrocarbon group (ph1) and the phenolic hydroxyl group-containing aromatic hydrocarbon group (ph2) are bonded through the divalent aralkyl group (X). This phenolic resin is used as a curing agent for an epoxy resin.

16 Claims, 7 Drawing Sheets

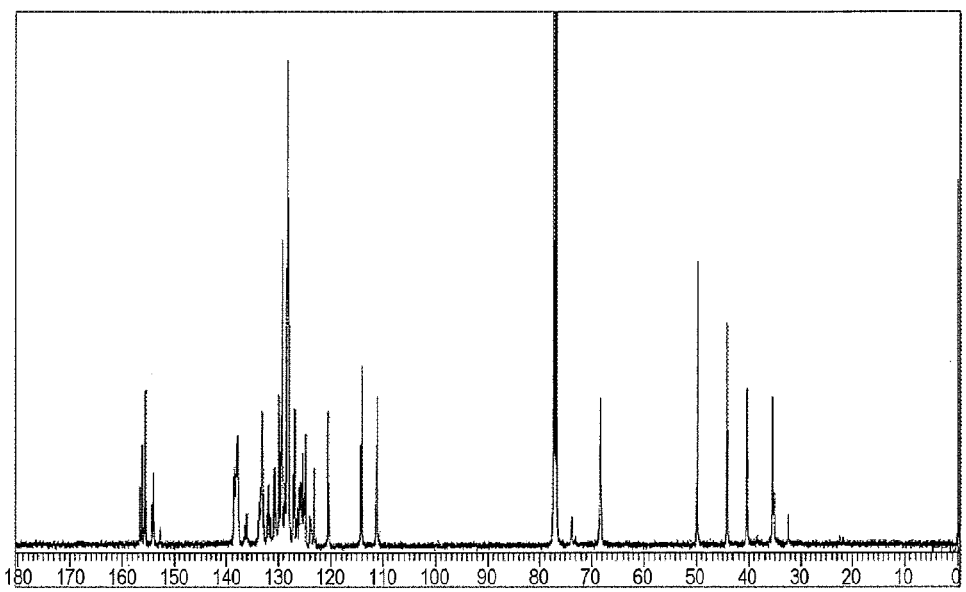

CURABLE RESIN COMPOSITION, CURED PRODUCT THEREOF, PHENOLIC RESIN, EPOXY RESIN, AND SEMICONDUCTOR SEALING MATERIAL

TECHNICAL FIELD

The present invention relates to a thermosetting resin composition, the cured product of which is good in terms of heat resistance, resistance to moisture and solder, flame retardancy, dielectric properties, and curability during a curing reaction, and which can be suitably used in applications of a semiconductor sealing material, a printed circuit board, a coating material, cast molding, and the like, a cured product thereof, a phenolic resin, an epoxy resin, and a semiconductor sealing material containing the thermosetting resin composition.

BACKGROUND ART

Epoxy resin compositions containing an epoxy resin and a curing agent as essential components are good in terms of physical properties such as high heat resistance, moisture resistance, and low viscosity and thus are widely used in a semiconductor sealing material, electronic components such as a printed circuit board, an electronic component field, conductive adhesives such as a conductive paste, other adhesives, matrixes for composite materials, coating materials, photoresist materials, color developing materials, etc.

Recently, in various applications, in particular, in applications to advanced materials, further improvement in properties such as heat resistance and resistance to moisture and solder has been required. For example, in the field of semiconductor sealing materials, surface mount packages such as a ball grid array (BGA) and a chip size package (CSP) have been developed and a reflow treatment temperature has been increased due to the use of lead-free solder. Consequently, electronic component-sealing resin materials having good resistance to moisture and solder have been further required.

Furthermore, recently, there has been an increasing trend in which halogen flame retardants are not used in view of environmental friendliness, and an epoxy resin and a phenolic resin (curing agent) that are halogen-free and that exhibit a high degree of flame retardancy have been desired.

As an example of a phenolic resin and epoxy resin for electronic component-sealing materials, the resins being capable of meeting such required properties, an epoxy resin or curing agent (phenolic resin) to which a benzyl ether structure is introduced by reacting a phenolic resin with a benzylating agent such as benzyl chloride under an alkaline condition has been disclosed (refer to, for example, PTL 1 and PTL 2).

However, although the epoxy resin and the phenolic resin described in PTL 1 or PTL 2 have improved flame retardancy, the flame retardancy does not reach the high level that has been recently required. In addition, the resistance of these resins to moisture and solder is also not sufficient.

Thus, epoxy resin compositions that combine a high degree of flame retardancy with high resistance to moisture and solder have not been obtained in the field of electronic component materials.

CITATION LIST

Patent Literature

PTL 1: Japanese Unexamined Patent Application Publication No. 2009-286944
PTL 2: Japanese Unexamined Patent Application Publication No. 2009-286949

SUMMARY OF INVENTION

Technical Problem

Accordingly, an object to be achieved by the present invention is to provide a thermosetting resin composition that realizes a high degree of resistance to moisture and solder, the resistance being required for a recent electronic component material, and a high degree of flame retardancy without containing halogen in view of environmental friendliness, a cured product of the thermosetting resin composition, a semiconductor sealing material containing the thermosetting resin composition, and a phenolic resin and an epoxy resin that provide these properties.

Solution to Problem

As a result of intensive studies conducted in order to achieve the object, the inventors of the present invention found that a thermosetting resin composition that has a low viscosity and high resistance to moisture and solder, and that realizes a high degree of flame retardancy without containing halogen can be obtained by introducing a naphthylmethyloxy group or an anthrylmethyloxy group into an aromatic nucleus of a phenolic resin or an epoxy resin, and completed the present invention.

Specifically, the present invention relates to a thermosetting resin composition containing an epoxy resin (A) and a phenolic resin (B) as essential components, in which the phenolic resin (B) has structural moieties which are a naphthylmethyloxy group- or anthrylmethyloxy group-containing aromatic hydrocarbon group (ph1), a phenolic hydroxyl group-containing aromatic hydrocarbon group (ph2), and a divalent aralkyl group (X) represented by general formula 1 below:

[Chem. 1]

General formula 1

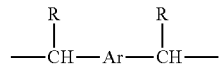

(where Ar represents a phenylene group or a biphenylene group and Rs each independently represent a hydrogen atom or a methyl group)
and has a structure in which plural aromatic hydrocarbon groups selected from the group consisting of the naphthylmethyloxy group- or anthrylmethyloxy group-containing aromatic hydrocarbon group (ph1) and the phenolic hydroxyl group-containing aromatic hydrocarbon group (ph2) are bonded through the divalent aralkyl group (X) (hereinafter, this thermosetting resin composition is abbreviated as "thermosetting resin composition (I)").

Furthermore, the present invention relates to an epoxy resin cured product obtained by curing the thermosetting resin composition (I).

Furthermore, the present invention relates to a phenolic resin having structural moieties which are a naphthylmethyloxy group- or anthrylmethyloxy group-containing aromatic hydrocarbon group (ph1), a phenolic hydroxyl group-containing aromatic hydrocarbon group (ph2), and a divalent aralkyl group (X) represented by general formula 1 below:

[Chem. 2]

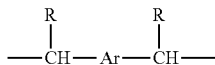

General formula 1

(where Ar represents a phenylene group or a biphenylene group and Rs each independently represent a hydrogen atom or a methyl group)
and having, in its molecular structure, a structure in which plural aromatic hydrocarbon groups selected from the group consisting of the naphthylmethyloxy group- or anthrylmethyloxy group-containing aromatic hydrocarbon group (ph1) and the phenolic hydroxyl group-containing aromatic hydrocarbon group (ph2) are bonded through the divalent aralkyl group (X).

Furthermore, the present invention relates to a thermosetting resin composition containing an epoxy resin (A') and a curing agent (B') as essential components, in which the epoxy resin (A') has structural moieties which are a naphthylmethyloxy group- or anthrylmethyloxy group-containing aromatic hydrocarbon group (ph1), a glycidyloxy group-containing aromatic hydrocarbon group (ep), and a divalent aralkyl group (X) represented by general formula 1 below:

[Chem. 3]

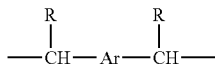

General formula 1

(where Ar represents a phenylene group or a biphenylene group and Rs each independently represent a hydrogen atom or a methyl group) and has a structure in which aromatic hydrocarbon groups selected from the group consisting of the naphthylmethyloxy group- or anthrylmethyloxy group-containing aromatic hydrocarbon group (ph1) and the glycidyloxy group-containing aromatic hydrocarbon group (ep) are bonded through the divalent aralkyl group (X) (hereinafter, this thermosetting resin composition is abbreviated as "thermosetting resin composition (II)").

Furthermore, the present invention relates to a semiconductor sealing material containing the epoxy resin (A') and the curing agent (B') in the thermosetting resin composition (II), and an inorganic filler in an amount of 70% to 95% by mass in the composition.

Furthermore, the present invention relates to a cured product obtained by curing the thermosetting resin composition (II).

Furthermore, the present invention relates to an epoxy resin having structural moieties which are a naphthylmethyloxy group- or anthrylmethyloxy group-containing aromatic hydrocarbon group (ph1), a glycidyloxy group-containing aromatic hydrocarbon group (ep), and a divalent aralkyl group (X) represented by general formula 1 below:

[Chem. 4]

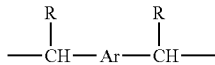

General formula 1

(where Ar represents a phenylene group or a biphenylene group and Rs each independently represent a hydrogen atom or a methyl group)
and having a structure in which aromatic hydrocarbon groups selected from the group consisting of the naphthylmethyloxy group- or anthrylmethyloxy group-containing aromatic hydrocarbon group (ph1) and the glycidyloxy group-containing aromatic hydrocarbon group (ep) are bonded through the divalent aralkyl group (X).

Advantageous Effects of Invention

According to the present invention, an object to be achieved by the present invention can be realized by providing a thermosetting resin composition that realizes a high degree of resistance to moisture and solder, the resistance being required for a recent electronic component material, and a high degree of flame retardancy without containing halogen in view of environmental friendliness, a cured product of the thermosetting resin composition, a semiconductor sealing material containing the thermosetting resin composition, and a phenolic resin and an epoxy resin that provide these properties.

BRIEF DESCRIPTION OF DRAWINGS

FIG. 10 is a $C^{13}$-NMR chart of the epoxy resin (E-1) prepared in Example 5.
FIG. 11 is a MS spectrum of the epoxy resin (E-1) prepared in Example 5.

DESCRIPTION OF EMBODIMENTS

Figure 1:
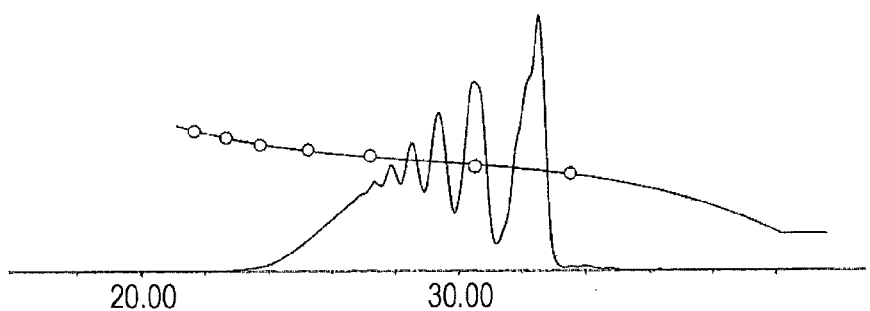
FIG. 1 is a GPC chart of a phenolic resin (A-1) prepared in Example 1.

The present invention will now be described in detail.
First, a thermosetting resin composition (I) of the present invention is a thermosetting resin composition containing an epoxy resin (A) and a phenolic resin (B) as essential components, in which the phenolic resin (B) has structural moieties which are a naphthylmethyloxy group- or anthrylmethyloxy group-containing aromatic hydrocarbon group (ph1), a phenolic hydroxyl group-containing aromatic hydrocarbon group (ph2), and a divalent aralkyl group (X) represented by general formula 1 below:

[Chem. 5]

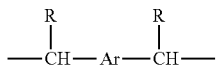

General formula 1

(where Ar represents a phenylene group or a biphenylene group and Rs each independently represent a hydrogen atom or a methyl group)
and has a structure in which plural aromatic hydrocarbon groups, preferably two aromatic hydrocarbon groups, selected from the group consisting of the naphthylmethyloxy group- or anthrylmethyloxy group-containing aromatic hydrocarbon group (ph1) and the phenolic hydroxyl group-containing aromatic hydrocarbon group (ph2) are bonded through the divalent aralkyl group (X). That is, since the phenolic resin (B) has the above resin structure as a basic skeleton, the resulting cured product has good heat resistance and good flame retardancy. Note that, in the present invention, this phenolic resin (B) is a novel phenolic resin of the present invention. Among the phenolic resins (B), a phenolic resin (B) which has a naphthylmethyloxy group- or anthrylmethyloxy group-containing aromatic hydrocarbon group (ph1) in which the ratio of the phenolic hydroxyl group to the naphthylmethyloxy group or anthrylmethyloxy group (the former: the latter) is 10:90 to 99:1 is preferable. The reason for this is as follows. An aromatic nucleus property of the resin can be enhanced, and fluidity of the resin is also maintained. In the application to a semiconductor sealing material, compatibility with an inorganic filler such as silica is improved, and in the application to a circuit board, an impregnating property is improved. Furthermore, a coefficient of thermal expansion in the form of a cured product is also low and adhesiveness is increased. In addition, flame retardancy and resistance to moisture and solder are significantly improved. In particular, the ratio is more preferably 60:40 to 90:10, and still more preferably 65:35 to 80:15 from the standpoint that good compatibility with a filler such as silica and a good impregnating property to a glass substrate are obtained, and the effects of the present invention become significant.

The thermosetting resin composition (I) of the present invention has a low viscosity though the thermosetting resin composition (I) has a bulky fused polycyclic skeleton, and has good curability and heat resistance though the thermosetting resin composition (I) has a low functional group concentration. When the resin composition has a low functional group concentration, the resulting cured product has a low moisture absorptivity, a low dielectric constant, and a low dielectric loss tangent. Thus, it is very useful for recent advanced electronics materials to have a low functional group concentration, which is an outstanding feature of the present invention.

As described above, the phenolic resin (B) in the thermosetting resin composition (I) has the naphthylmethyloxy group- or anthrylmethyloxy group-containing aromatic hydrocarbon group (ph1) and the phenolic hydroxyl group-containing aromatic hydrocarbon group (Ph2) in its resin structure, and, in the resin structure, a plurality of structural moieties selected from these aromatic hydrocarbon groups are bonded through the divalent aralkyl group (X) represented by general formula 1 below:

[Chem. 6]

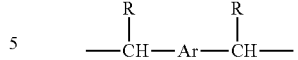

General formula 1

(where Ar represents a phenylene group or a biphenylene group and Rs each independently represent a hydrogen atom or a methyl group.) (Hereinafter, this group is abbreviated as "divalent aralkyl group (X)").

Examples of the naphthylmethyloxy group- or anthrylmethyloxy group-containing aromatic hydrocarbon group (ph1) include aromatic hydrocarbon groups represented by structural formulae Ph1 to Ph13 below.

[Chem. 7]

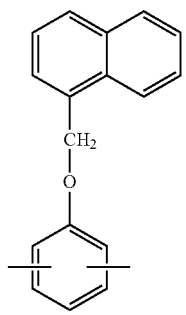

Ph1-1

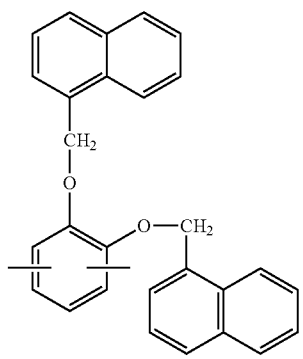

Ph1-2

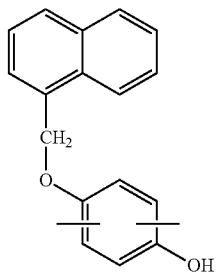

Ph1-3

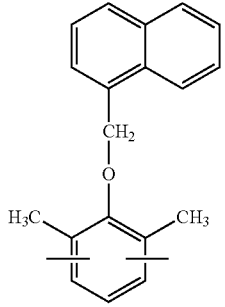

Ph1-4

Ph1-5
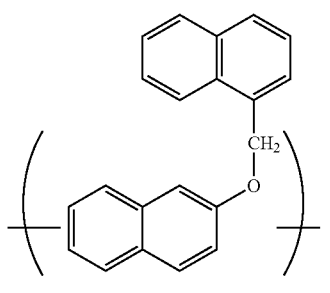

Ph1-6
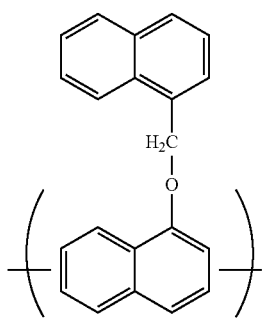

Ph1-7
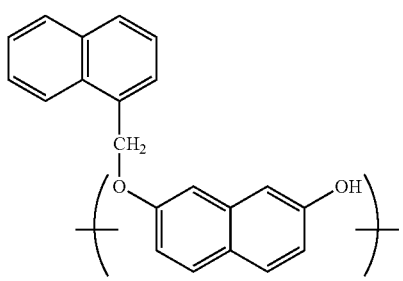

Ph1-8
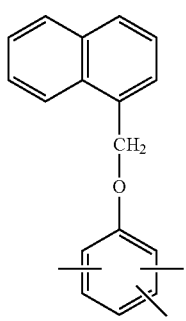

Ph1-9
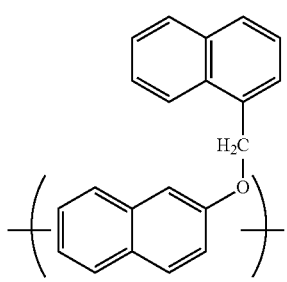

Ph1-10
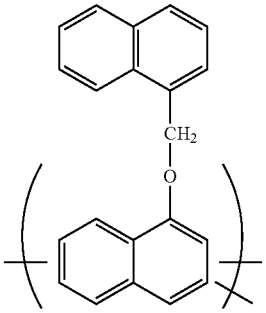

Ph1-11
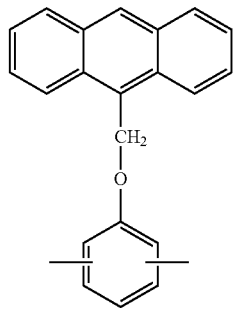

Ph1-12
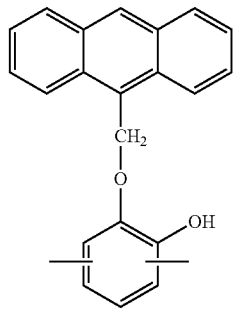

Ph1-13
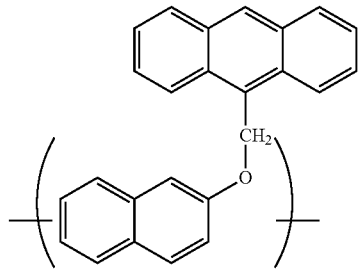

Among these structures, regarding those having two or more positions of bonding to other structural moieties on a naphthalene skeleton, the bonding positions may be located on the same nucleus or different nuclei. One aromatic skeleton may have both a phenolic hydroxyl group and a naphthylmethyloxy group or anthranylmethyloxy group.

In the present invention, among the above structures, the structure represented by structural formula Ph1-1, which has a phenol skeleton, is preferable from the standpoint of a low viscosity, good curability, good heat resistance, and good resistance to moisture and solder. As typified by structural formula Ph1-4, a structure including a phenol skeleton having a methyl group is preferable because a significant effect of improving heat resistance and resistance to moisture and solder can be obtained. In the case where the naphthylmethyloxy group- or anthrylmethyloxy group-containing aromatic hydrocarbon group (ph1) is located at a molecular terminal, examples of the group include structures represented by structural formulas Ph1-14 to Ph1-22.
[Chem. 8]
Ph1-14
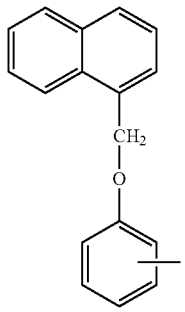
Ph1-15
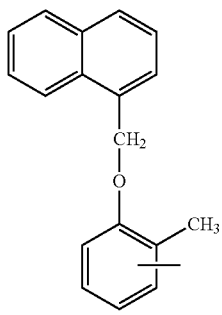
Ph1-16
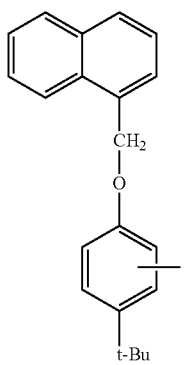
Ph1-17
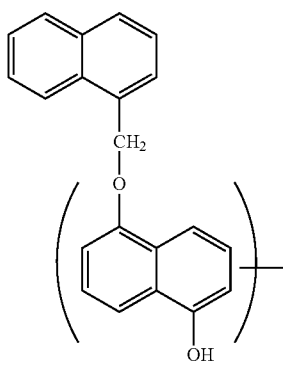
Ph1-18
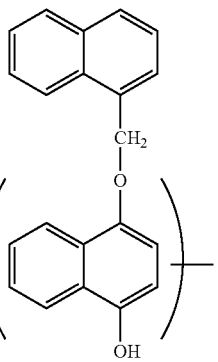
Ph1-19
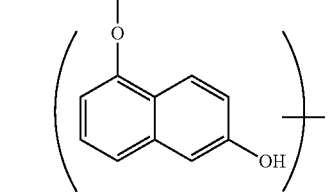
Ph1-20
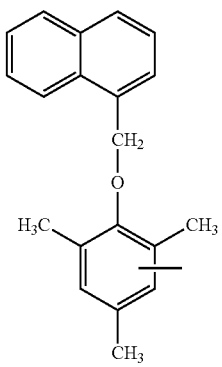
Ph1-21
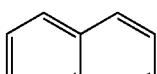

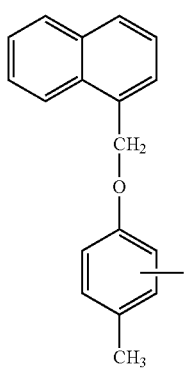
Ph1-22

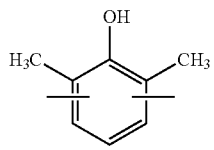
Ph2-6

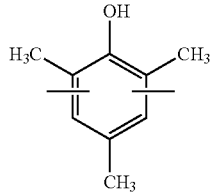
Ph2-7

Here, among these structures, in the case of a naphthalene skeleton, a methylene ether group and another structural moiety may be bonded on the same nucleus or different nuclei.

In the present invention, among the above structures, the structure represented by structural formula Ph1-14, which has a phenol skeleton, is preferable from the standpoint of a low viscosity, good curability, good heat resistance, and good resistance to moisture and solder. As typified by structural formulae Ph1-15, Ph1-20, and Ph1-22, structures including a phenol skeleton having a methyl group are preferable because a significant effect of improving heat resistance and resistance to moisture and solder can be obtained.

The phenolic hydroxyl group-containing aromatic skeleton (Ph2) is preferably an aromatic hydrocarbon group formed from phenol, naphthol, or a compound having an alkyl group as a substituent on an aromatic nucleus of phenol or naphthol from the standpoint of good heat resistance and good resistance to moisture and solder. Specific examples thereof include aromatic hydrocarbon groups represented by structural formulae Ph2-1 to Ph2-17 below.

[Chem. 9]

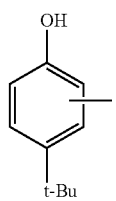
Ph2-8

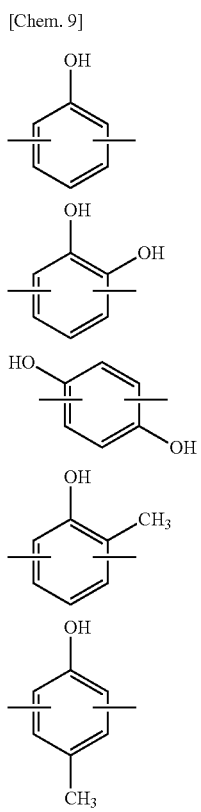

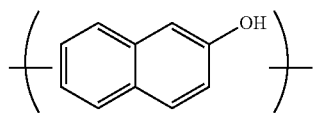
Ph2-9

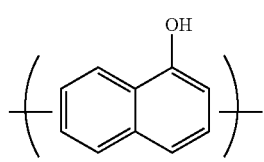
Ph2-10

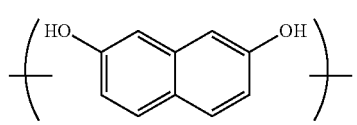
Ph2-11

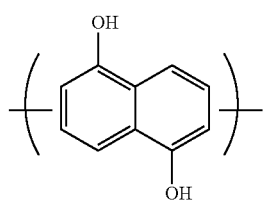
Ph2-12

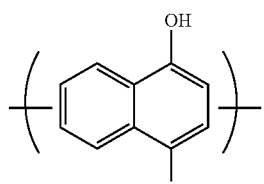
Ph2-13

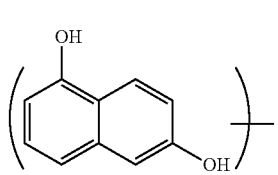
Ph2-14

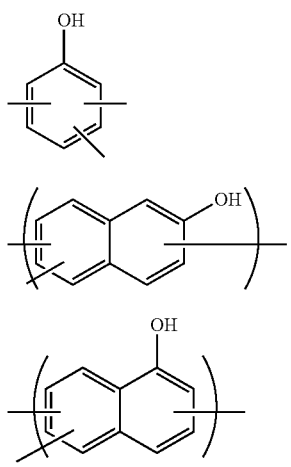

Among these structures, regarding those having two or more positions of bonding to other structural moieties on a naphthalene skeleton, the bonding positions may be located on the same nucleus or different nuclei.

In the present invention, among these, the aromatic hydrocarbon group represented by structural formula Ph2-1 is particularly preferable from the standpoint of good curability, and the aromatic hydrocarbon group represented by structural formula Ph2-4 is particularly preferable from the standpoint of good resistance to moisture and solder.

Next, as described above, the divalent aralkyl group (X) included in the resin structure of the phenolic resin (B) is represented by general formula 1 below:

[Chem. 10]

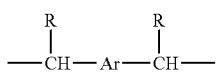

General formula 1

(where Ar represents a phenylene group or a biphenylene group and Rs each independently represent a hydrogen atom or a methyl group.) Specific examples thereof include structures represented by X1 to X5 below.

[Chem. 11]

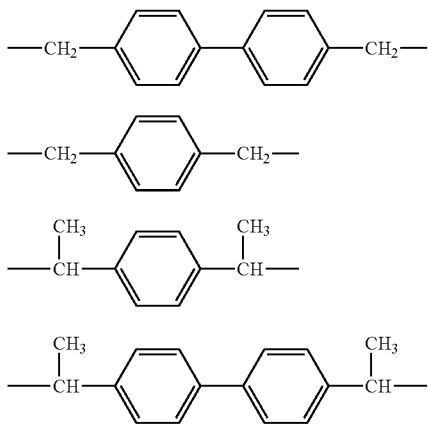

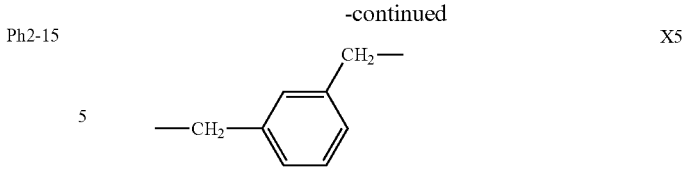

Among these, the structure represented by X1, X2, or X5 is particularly preferable from the standpoint of good flame retardancy and good resistance to moisture and solder.

The phenolic resin (B) used in the present invention has a resin structure in which plural aromatic hydrocarbon groups selected from the group consisting of a naphthylmethyloxy group- or anthrylmethyloxy group-containing aromatic hydrocarbon group (ph1) and a phenolic hydroxyl group-containing aromatic hydrocarbon group (Ph2) are bonded through a divalent aralkyl group (X). The form of these bonds may be any combination. When the naphthylmethyloxy group- or anthrylmethyloxy group-containing aromatic hydrocarbon group (ph1) is represented by "Ph1", the phenolic hydroxyl group-containing aromatic hydrocarbon group (Ph2) is represented by "Ph2", and the divalent aralkyl group (X) is represented by "X", examples of the molecular structure of the phenolic resin constituted by these structural moieties include random copolymers and block copolymers including, as repeating units, structural moieties represented by partial structural formulae B1 and B2 below:

[Chem. 12]

 B1

 B2 polymers in which B1 is present in a molecular chain of a polymer block including B2 as a repeating unit, polymers including, as a branch point, a structural moiety represented by any of structural formulae B3 to B8 below in the resin structure,

[Chem. 13]

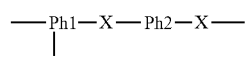 B3

 B4

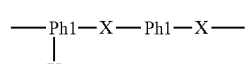 B5

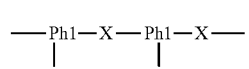 B6

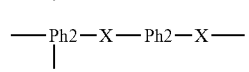 B7

-continued

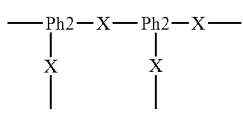
B8 and polymers including any of these structural moieties as a repeating unit and having a structure represented by structural formula B9 or B10 below at an end of the resin structure.

[Chem. 14]

Ph1-X-      B9

Ph2-X-      B10

In the present invention, because of such a characteristic chemical structure, the aromatic content in the molecular structure is high and good heat resistance and good flame retardancy can be imparted to the resulting cured product. In particular, a resin in which the aromatic nucleus constituting the naphthylmethyloxy group- or anthrylmethyloxy group-containing aromatic hydrocarbon group (ph1) or the phenolic hydroxyl group-containing aromatic skeleton (Ph2), which functions as a basic skeleton of the phenolic resin (B) of the present invention, is a phenyl group or an alkyl-substituted phenyl group is preferable from the standpoint that the effect of improving resistance to moisture and solder is significant. The aromatic nucleus constituted by a phenyl group or an alkyl-substituted phenyl group provides the resulting cured product with toughness, and the fused polycyclic skeleton arranged as a side chain exhibits a low viscosity. Thus, the thermal expansion is low, adhesiveness is improved, and the resistance to moisture and solder is markedly improved. In addition, frame retardancy can be improved.

Furthermore, the structural moiety bonded through the divalent aralkyl group (X) may include an alkoxy group-containing aromatic hydrocarbon group. Examples of the alkoxy group-containing aromatic hydrocarbon group include groups represented by structural formulae A1 to A13 below.

[Chem. 15]

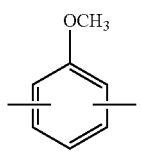
A1

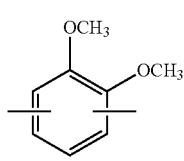
A2

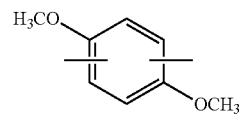
A3

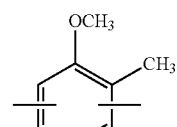
A4

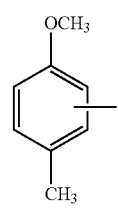
A5

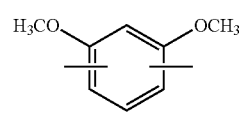
A6

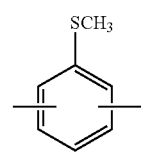
A7

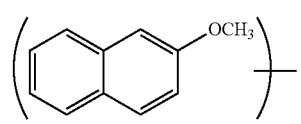
A8

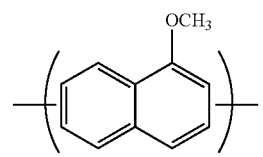
A9

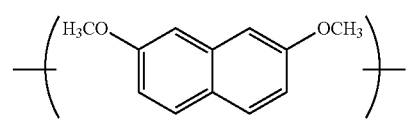
A10

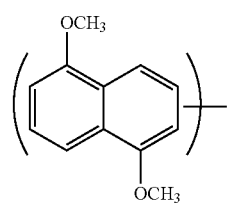
A11

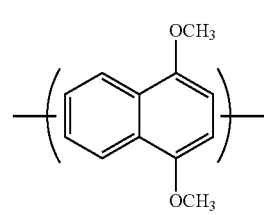
A12

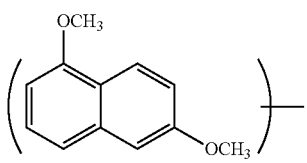
A13

In the present invention, when the phenolic resin (B) includes an alkoxy group-containing aromatic hydrocarbon group in the resin structure thereof, the alkoxy group-containing aromatic hydrocarbon group preferably has the structure represented by structural formula A8 above from the standpoint that the resulting cured product has good resistance and good frame retardancy, and the dielectric loss tangent of the cured product can be significantly reduced.

The phenolic resin (B) has a melt viscosity preferably in the range of 0.1 to 100 dPa·s at 150 degrees (Celsius) and particularly preferably in the range of 0.1 to 20 dPa·s at 150 degrees (Celsius) measured with an ICI viscometer from the standpoint of good fluidity during molding and good resistance to moisture and solder. Furthermore, the phenolic resin preferably has a hydroxyl equivalent in the range of 120 to 600 g/eq. from the standpoint that heat resistance and flame retardancy of the resulting cured product are further improved. In addition, the hydroxyl equivalent is particularly preferably in the range of 150 to 400 g/eq. from the standpoint of a particularly good balance among the resistance of the cured product to moisture and solder, flame retardancy of the cured product, and curability of the composition.

Regarding the abundance of the naphthylmethyloxy group or the anthrylmethyloxy group, the ratio of the phenolic hydroxyl group to the naphthylmethyloxy group or anthrylmethyloxy group is preferably 10:90 to 99:1 from the standpoint of a high effect of improving curability, moldability, resistance to moisture and solder, and flame retardancy. The ratio is more preferably 60:40 to 90:10, and still more preferably 65:35 to 8.0:15 from the standpoint that good compatibility with a filler such as silica and a good impregnating property to a glass substrate are obtained, and the effects of the present invention become significant.

The phenolic resin (B) can be produced by a method described in detail below.

Specific examples of the method for producing the phenolic resin (B) include a method including reacting a divalent aralkyl group-containing phenolic resin such as a phenol aralkyl resin represented by structural formula M1 below:

[Chem. 16]

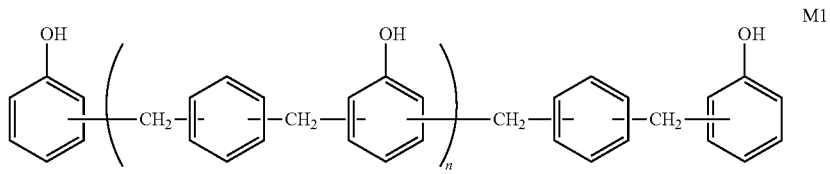

(where n is an integer of 0 or more),
a biphenyl novolac resin represented by structural formula M2 below:

[Chem. 17]

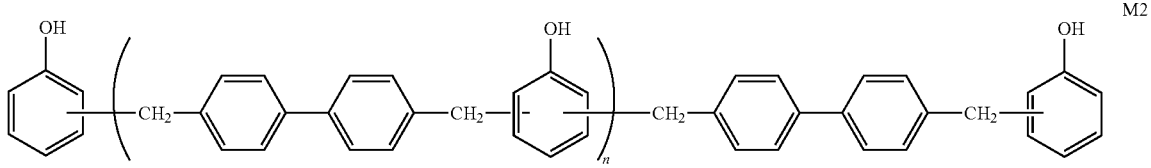

(where n is an integer of 0 or more),
or a naphthol aralkyl resin represented by structural formula M3 below: 7

[Chem. 18]

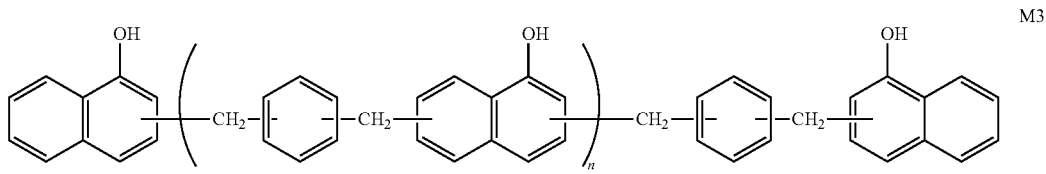

(where n is an integer of 0 or more) with a naphthylmethylating agent or anthrylmethylating agent (a2) (method 1) and a method including reacting a phenolic compound (Ph1') with a divalent aralkylating agent (X') to produce an aralkyl-type phenolic resin, and then reacting the aralkyl-type phenolic resin with a naphthylmethylating agent or anthrylmethylating agent (a2) (method 2).

Examples of the phenolic compound (Ph1') that can be used in method 2 include phenolic compounds such as unsubstituted phenolic compounds, e.g., phenol, resorcinol, and hydroquinone; monosubstituted phenolic compounds, e.g., cresol, phenylphenol, ethylphenol, n-propylphenol, iso-propylphenol, and t-butylphenol; disubstituted phenolic compounds, e.g., xylenol, methylpropylphenol, methylbutylphenol, methylhexylphenol, dipropylphenol, and dibutylphenol; trisubstituted phenolic compounds, e.g., mesitol, 2,3,5-trimethylphenol, and 2,3,6-trimethylphenol; and naphthols, e.g., 1-naphthol, 2-naphthol, and methylnaphthol.

Among these phenolic compounds, 1-naphthol, 2-naphthol, cresol, and phenol are particularly preferable from the standpoint of good flame retardancy of the resulting cured product, good resistance of the resulting cured product to moisture and solder, and good fluidity of the composition.

Specific examples of the divalent aralkylating agent (X') include 1,2-di(chloromethyl)benzene, 1,2-di(bromomethyl) benzene, 1,3-di(chloromethyl)benzene, 1,3-di(fluoromethyl) benzene, 1,4-di(chloromethyl)benzene, 1,4-di(bromomethyl)benzene, 1,4-di(fluoromethyl)benzene, 1,4-di (chloromethyl)-2,5-dimethylbenzene, 1,3-di(chloromethyl)-4,6-dimethylbenzene, 1,3-di(chloromethyl)-2,4-dimethylbenzene, 4,4'-bis(chloromethyl)biphenyl, 2,2'-bis (chloromethyl)biphenyl, 2,4'-bis(chloromethyl)biphenyl, 2,3'-bis(chloromethyl)biphenyl, 4,4'-bis(bromomethyl)biphenyl, 4,4'-bis(chloromethyl)diphenyl ether, 2,7-di(chloromethyl)naphthalene, p-xylylene glycol, m-xylene glycol, 1,4-di(2-hydroxy-2-ethyl)benzene, 4,4'-bis(dimethylol)biphenyl, 2,4'-bis(dimethylol)biphenyl, 4,4'-bis(2-hydroxy-2-propyl)biphenyl, 2,4'-bis(2-hydroxy-2-propyl)biphenyl, 1,4'-di(methoxymethyl)benzene, 1,4'-di(ethoxymethyl)benzene, 1,4'-di(isopropoxy)benzene, 1,4'-di(butoxy)benzene, 1,3'-di (methoxymethyl)benzene, 1,3'-di(ethoxymethyl)benzene, 1,3'-di(isopropoxy)benzene, 1,3'-di(butoxy)benzene, 1,4-di (2-methoxy-2-ethyl)benzene, 1,4-di(2-hydroxy-2-ethyl)benzene, 1,4-di(2-ethoxy-2-ethyl)benzene, 4,4'-bis(methoxymethyl)biphenyl, 2,4'-bis(methoxymethyl)biphenyl, 2,2'-bis (methoxymethyl)biphenyl, 2,3'-bis(methoxymethyl) biphenyl, 3,3'-bis(methoxymethyl)biphenyl, 3,4'-bis (methoxymethyl)biphenyl, 4,4'-bis(ethoxymethyl)biphenyl, 2,4'-bis(ethoxymethyl)biphenyl, 4,4'-bis(isopropoxy)methylbiphenyl, 2,4'-bis(isopropoxy)methylbiphenyl, bis(1-methoxy-1-ethyl)biphenyl, bis(1-methoxy-1-ethyl)biphenyl, bis(1-isopropoxy-1-ethyl)biphenyl, bis(2-hydroxy-2-propyl) biphenyl, bis(2-methoxy-2-propyl)biphenyl, bis(2-isopropoxy-2-propyl)biphenyl, p-divinylbenzene, m-divinylbenzene, and 4,4'-bis(vinyl)biphenyl.

In the reaction between the phenolic compound (Ph1') and the divalent aralkylating agent (X'), an excess amount of the phenolic compound relative to the aralkylating agent is used. The amount of condensing agent used is in the range of 0.01 to 1.0 mole relative to 1 mole of the phenolic compound. The amount of condensing agent used is preferably in the range of 0.01 to 0.7 moles, and 0.05 to 0.5 moles relative to 1 mole of the phenolic compound. When the amount is larger than this, the resulting resin obtained after the reaction with the naphthylmethylating agent or the anthrylmethylating agent has a high viscosity, resulting in problems in terms of moldability and impregnating property. Consequently, the effects of the present invention cannot be sufficiently obtained.

This reaction is preferably conducted in the presence of an acid catalyst. This acid catalyst can be appropriately selected from known inorganic acids and organic acids. Examples of the acid catalyst include mineral acids such as hydrochloric acid, sulfuric acid, and phosphoric acid; organic acids such as formic acid, oxalic acid, trifluoroacetic acid, p-toluenesulfonic acid, and diethyl sulfate; Lewis acids such as zinc chloride, aluminum chloride, iron chloride, and boron trifluoride; and solid acids such as activated clay, silica-alumina, and zeolite.

The reaction in method 2 may be conducted at 10 to 250 degrees (Celsius) for 1 to 20 hours. Furthermore, an alcohol such as methanol, ethanol, propanol, butanol, ethylene glycol, methyl cellosolve, or ethyl cellosolve; benzene; toluene; chlorobenzene; dichlorobenzene; or the like may be used as a reaction solvent.

After the completion of the reaction, in some cases, the catalyst is removed by a method including neutralization, water washing, etc., and the remaining solvent and the unreacted phenolic compound are removed to the outside of the reaction system by a method of, for example, distillation under reduced pressure, as required, to obtain a polyhydric hydroxy resin. The content of the unreacted phenolic compound is usually 3% or less, and preferably 1% or less. When the content of the unreacted phenolic compound is higher than this, heat resistance of the resulting cured product decreases. However, when a divalent or higher-valent phenolic compound is used in the reaction, the remaining phenolic compound need not be removed after the reaction.

Specific examples of the naphthylmethylating agent or anthrylmethylating agent (a2) used in method 1 or method 2 include 1-naphthylmethyl chloride, 2-naphthylmethyl chloride, and (9-anthrylmethyl) chloride.

In the reaction between the divalent aralkyl group-containing phenolic resin and the naphthylmethylating agent or anthrylmethylating agent (a2) in method 1 or the reaction between the aralkyl-type phenolic resin and the naphthylmethylating agent or anthrylmethylating agent (a2) in method 2, it is necessary to use an alkali catalyst. Examples of the alkali catalyst used in this reaction include inorganic alkalis such as alkali metal hydroxides, e.g., sodium hydroxide and potassium hydroxide, metallic sodium, metallic lithium, sodium carbonate, and potassium carbonate. Regarding the amount of alkali catalyst used, the number of moles of the alkali catalyst is preferably 1.0 to 2.0 times the number of moles of the naphthylmethylating agent or anthrylmethylating agent (a2). A quaternary ammonium salt such as tetraethylammonium chloride may be used in combination, however, the reaction proceeds without using a quaternary ammonium salt. The reaction temperature is 20 degrees (Celsius) to 150 degrees (Celsius), and preferably 40 degrees (Celsius) to 120 degrees (Celsius).

In conducting this reaction, an organic solvent may be used as required. Specific examples of the organic solvent that can be used include, but are not limited to, methyl cellosolve, ethyl cellosolve, toluene, xylene, and methyl isobutyl ketone. However, in the case where 1-naphthylmethyl chloride, 2-naphthylmethyl chloride, or (9-anthrylmethyl) chloride is used, it is not preferable to use alcohol organic solvents because a side reaction may occur. The amount of organic solvent used is usually 10% to 500% by mass, and preferably 30% to 250% by mass relative to the total mass of the charged raw materials.

In the case where the resulting polyvalent hydroxy compound is significantly colored, an antioxidant or a reducing agent may be added so as to prevent coloring. Examples of the antioxidant include, but are not particularly limited to, hindered phenol compounds such as 2,6-dialkyl phenol derivatives, divalent sulfur compounds, and phosphorous acid ester compounds having a trivalent phosphorus atom. Examples of the reducing agent include, but are not particularly limited to, hypophosphorous acid, phosphorous acid, thiosulfuric acid, sulfurous acid, hydrosulfite, salts thereof, and zinc.

After the completion of the reaction, the reaction mixture is neutralized or washed with water until the pH of the reaction mixture becomes 5 to 9, and preferably 6 to 8, as required. The neutralization treatment and water washing treatment may be conducted according to conventional methods. Acidic substances such as acetic acid, phosphoric acid, and sodium phosphate may be used as a neutralizing agent. After the neutralization treatment or the water washing treatment is conducted, the unreacted naphthylmethylating agent or anthrylmethylating agent, the organic solvent, and by-products are distilled off by heating under reduced pressure to concentrate the resulting product. Thus, the phenolic resin of the present invention can be produced. It is more preferable to introduce a microfiltration step into the treatment after the completion of the reaction because inorganic salts and foreign matters can be removed by purification.

When the phenolic resin (B) is epoxidized in the subsequent step, the neutralization treatment or the water washing treatment may not be performed.

In the thermosetting resin composition (I) of the present invention, the phenolic resin (B) may be used alone, or another curing agent (b) for an epoxy resin may also be used as long as the effects of the present invention are not impaired. Specifically, the other curing agent may be used in combination so that the content of the phenolic resin (B) is 30% by mass or more, and preferably 40% by mass or more relative to the total mass of the curing agent.

Examples of the other curing agent (b) for an epoxy resin, which can be used in combination with the phenolic resin (B) of the present invention, include, but are not particularly limited to, amine compounds, amide compounds, acid anhydride compounds, phenolic compounds other than the phenolic resin (B) described above, and polyhydric phenolic compounds such as aminotriazine-modified phenolic resins (polyhydric phenolic compounds in which phenol nuclei are joined by melamine, benzoguanamine, or the like).

Examples of the phenolic compound other than the phenolic resin (B) include novolac resins such as phenol novolac resins, cresol novolac resins, phenol novolac resins, cresol novolac resins, naphthol novolac resins, naphthol-phenol co-condensed novolac resins, and naphthol-cresol co-condensed novolac resins; and methoxy aromatic structure-containing phenolic resins such as phenolic resins having a resin structure in which a methoxynaphthalene skeleton is bonded to an aromatic nucleus of any of the above novolac resins through a methylene group and phenolic resins having a resin structure in which a methoxyphenyl skeleton is bonded to an aromatic nucleus of any of the above novolac resins through a methylene group;

aralkyl-type phenolic resins such as phenol aralkyl resins represented by the structural formula below:

[Chem. 19]

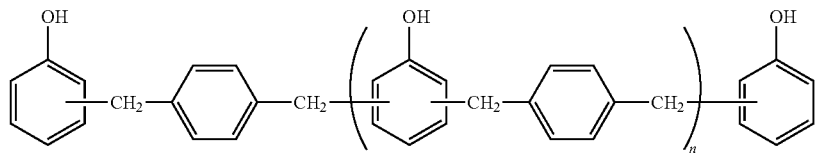

(where n represents the number of repeating units and is an integer of 0 or more), naphthol aralkyl resins represented by the structural formula below:

[Chem. 20]

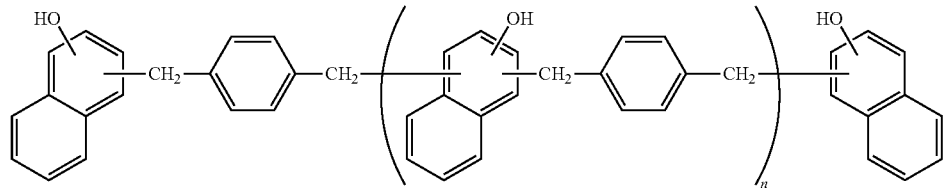

(where n represents the number of repeating units and is an integer of 0 or more), biphenyl-modified phenolic resins represented by the structural formula below:

[Chem. 21]

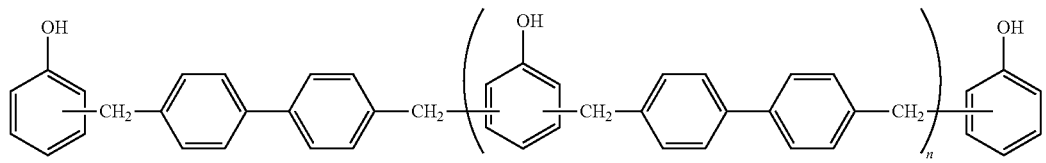

(where n represents the number of repeating units and is an integer of 0 or more),
and biphenyl-modified naphthol resins represented by the structural formula below:

[Chem. 22]

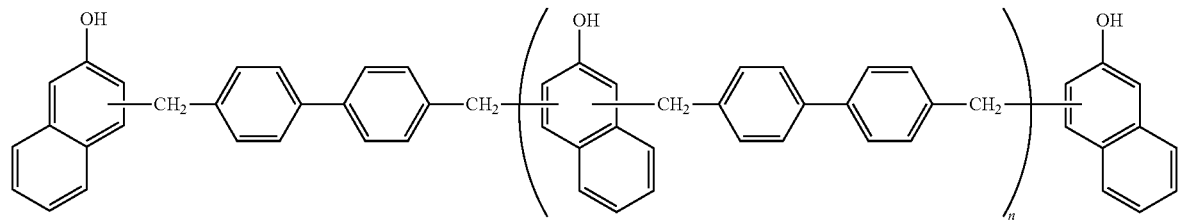

(where n represents the number of repeating units and is an integer of 0 or more);
phenolic resins having a resin structure in which a methoxynaphthalene skeleton is bonded to an aromatic nucleus of any of the above aralkyl-type phenolic resins through a methylene group and phenolic resins having a resin structure in which a methoxyphenyl skeleton is bonded to an aromatic nucleus of any of the aralkyl-type phenolic resins through a methylene group;
novolac resins that include an aromatic methylene as a linking group and that are represented by the structural formula below:

[Chem. 23]

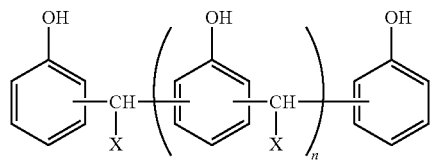

(where X represents a phenyl group or a biphenyl group, and n represents the number of repeating units and is an integer of 0 or more); trimethylolmethane resins, tetraphenylolethane resins, and dicyclopentadiene-phenol addition reaction-type phenolic resins.

Among these, resins having a large number of aromatic skeletons in its molecular structure are particularly preferable from the standpoint of the flame-retardant effect. Specifically, phenol novolac resins, cresol novolac resins, novolac resins that include an aromatic methylene as a linking group, phenol aralkyl resins, naphthol aralkyl resins, naphthol novolac resins, naphthol-phenol co-condensed novolac resins, naphthol-cresol co-condensed novolac resins, biphenyl-modified phenolic resins, biphenyl-modified naphthol resins, methoxy aromatic structure-containing phenolic resins, and aminotriazine-modified phenolic resins are preferable from the standpoint of good flame retardancy.

Examples of the epoxy resin (A) used in the thermosetting resin composition (I) of the present invention include naphthalene-type epoxy resins such as diglycidyloxynaphthalene, 1,1-bis(2,7-diglycidyloxynaphthyl)methane, and 1-(2,7-diglycidyloxynaphthyl)-1-(2'-glycidyloxynaphthyl)methane; bisphenol-type epoxy resins such as bisphenol A-type epoxy resins and bisphenol F-type epoxy resins; novolac-type epoxy resins such as phenol novolac-type epoxy resins, cresol novolac-type epoxy resins, bisphenol A novolac-type epoxy resins, naphthol-novolac-type epoxy resins, biphenyl novolac-type epoxy resins, naphthol-phenol co-condensed novolac-type epoxy resins, and naphthol-cresol co-condensed novolac-type epoxy resins; epoxy resins having a resin structure in which a methoxynaphthalene skeleton is bonded to an aromatic nucleus of any of the above novolac-type epoxy resins through a methylene group and epoxy resins having a resin structure in which a methoxyphenyl skeleton is bonded to an aromatic nucleus of any of the above novolac-type epoxy resins through a methylene group; phenol aralkyl-type epoxy resins represented by structural formula a1 below:

[Chem. 24]

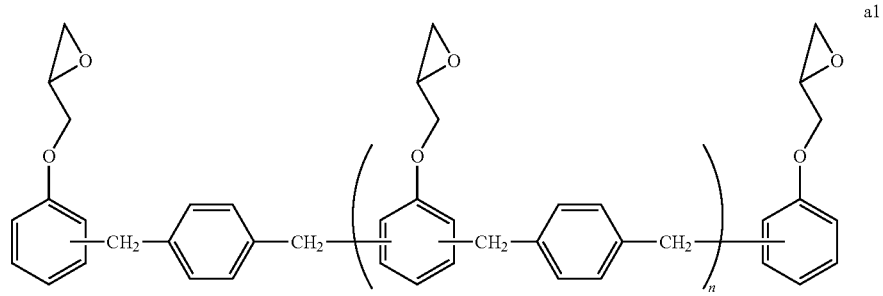

(where n represents the number of repeating units and is an integer of 0 or more), naphthol aralkyl-type epoxy resins represented by structural formula a2 below:

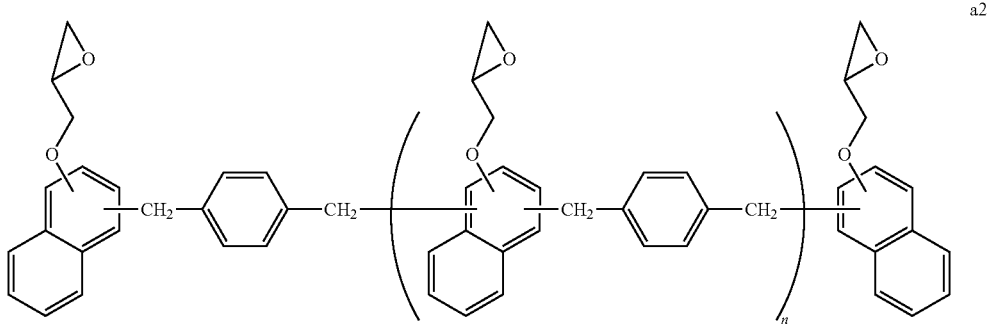

(where n represents the number of repeating units and is an integer of 0 or more),
biphenyl-type epoxy resins represented by structural formula a3 below:

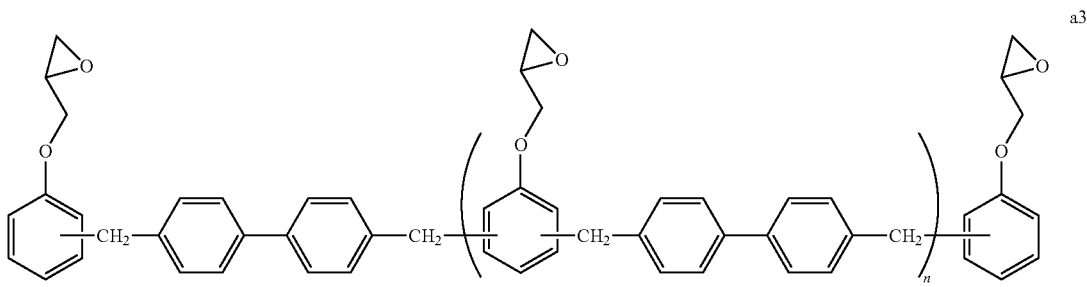

(where n represents the number of repeating units and is an integer of 0 or more),
and novolac-type epoxy resins that include an aromatic methylene as a linking group and that are represented by structural formula a4 below:

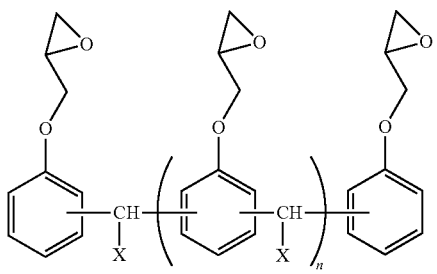

(where X represents a phenyl group or a biphenyl group, and n represents the number of repeating units and is an integer of 0 or more);
epoxy resins having a resin structure in which a methoxynaphthalene skeleton is bonded to an aromatic nucleus of any of the above aralkyl-type epoxy resins through a methylene group and epoxy resins having a resin structure in which a methoxyphenyl skeleton is bonded to an aromatic nucleus of any of the above aralkyl-type epoxy resins through a methylene group; tetramethylbiphenyl-type epoxy resins, triphenylmethane-type epoxy resins, tetraphenylethane-type epoxy resins, and dicyclopentadiene-phenol addition reaction-type epoxy resins. These epoxy resins may be used alone or in combination of two or more resins.

Among these, naphthalene-type epoxy resins, naphthol-novolac-type epoxy resins, phenol aralkyl-type epoxy resins, biphenyl-type epoxy resins, alkoxy group-containing novolac-type epoxy resins, and alkoxy group-containing aralkyl-type epoxy resins are particularly preferable from the standpoint of good flame retardancy and good dielectric properties.

Regarding the amounts of epoxy resin (A) and phenolic resin (B) blended in the thermosetting resin composition (I) of the present invention, the amount of active group in the curing agent containing the phenolic resin (B) is preferably 0.7 to 1.5 equivalents relative to 1 equivalent of the total amount of epoxy groups of the epoxy resin (A) because the resulting cured product has good properties.

A curing accelerator may be used in combination with the thermosetting resin composition (I) of the present invention, as required. Various curing accelerators can be used and examples thereof include phosphorus compounds, tertiary amines, imidazoles, organic acid metal salts, Lewis acids, and amine complex salts. When the thermosetting resin composition (I) is used in semiconductor sealing materials, phosphorus compounds such as triphenylphosphine and tertiary amines such as 1,8-diazabicyclo-[5.4.0]-undecene (DBU) are preferable from the standpoint of good curability, heat resistance, electrical properties, resistance to moisture and solder, etc.

Another thermosetting resin composition (II) of the present invention is a thermosetting resin composition containing an epoxy resin (A') and a curing agent (B') as essential components, in which the epoxy resin (A') has structural moieties which are a naphthylmethyloxy group- or anthrylmethyloxy group-containing aromatic hydrocarbon group (ph1), a glycidyloxy group-containing aromatic hydrocarbon group (ep), and a divalent aralkyl group (X) represented by general formula 1 below:

[Chem. 28]

General formula 1

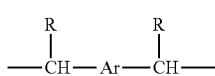

(where Ar represents a phenylene group or a biphenylene group and Rs each independently represent a hydrogen atom or a methyl group)
and has a structure in which aromatic hydrocarbon groups selected from the group consisting of the naphthylmethyloxy group- or anthrylmethyloxy group-containing aromatic hydrocarbon group (ph1) and the glycidyloxy group-containing aromatic hydrocarbon group (ep) are bonded through the divalent aralkyl group (X).

Specifically, the epoxy resin (A') in the thermosetting resin composition (II) is obtained by reacting the phenolic resin (B) contained in the thermosetting resin composition (I) with an epihalohydrin to epoxidize the phenolic resin (B) and has a basic skeleton common to that of the phenolic resin (B). Therefore, as in the case of the phenolic resin (B), the aromatic nucleus property of the resin can be enhanced, and flame retardancy and resistance to moisture and solder are significantly improved. Note that, in the present invention, this epoxy resin (A') is a novel epoxy resin of the present invention.

Regarding the abundance of the naphthylmethyloxy group or the anthrylmethyloxy group, the ratio of the glycidyloxy group to the naphthylmethyloxy group or anthrylmethyloxy group (the former:the latter) is 10:90 to 99:1 is preferable. The reason for this is as follows. An aromatic nucleus property of the resin can be enhanced, and fluidity of the resin is also maintained. In the application to a semiconductor sealing material, compatibility with an inorganic filler such as silica is improved, and in the application to a circuit board, an impregnating property is improved. Furthermore, the coefficient of thermal expansion in the form of a cured product is also low and a good adhesiveness is obtained. The ratio is more preferably 60:40 to 90:10, and still more preferably 65:35 to 80:15 from the standpoint that good compatibility with a filler such as silica and a good impregnating property to a glass substrate are obtained, and the effects of the present invention become significant.

As described above, the epoxy resin (A') in the thermosetting resin composition (II) has the naphthylmethyloxy group- or anthrylmethyloxy group-containing aromatic hydrocarbon group (ph1) and the glycidyloxy group-containing aromatic hydrocarbon group (ep) in its resin structure, and, in the resin structure, a plurality of these structural moieties are bonded through the divalent aralkyl group (X) represented by general formula 1 below:

[Chem. 29]

General formula 1

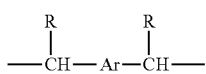

(where Ar represents a phenylene group or a biphenylene group and Rs each independently represent a hydrogen atom or a methyl group.)

Examples of the naphthylmethyloxy group- or anthrylmethyloxy group-containing aromatic hydrocarbon group (ph1) include the aromatic hydrocarbon groups represented by structural formulae Ph1 to Ph13 above.

The glycidyloxy group-containing aromatic skeleton (ep) is preferably an aromatic hydrocarbon group formed from phenol, naphthol, or a compound having an alkyl group as a substituent on an aromatic nucleus of phenol or naphthol from the standpoint of good heat resistance and good resistance to moisture and solder. Specific examples thereof include aromatic hydrocarbon groups represented by structural formulae Ep1-1 to Ep1-17 below.

[Chem. 30]

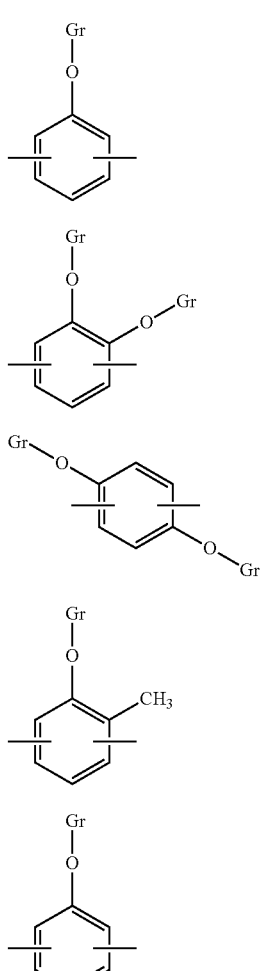

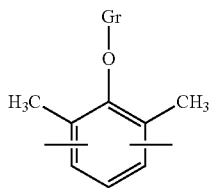

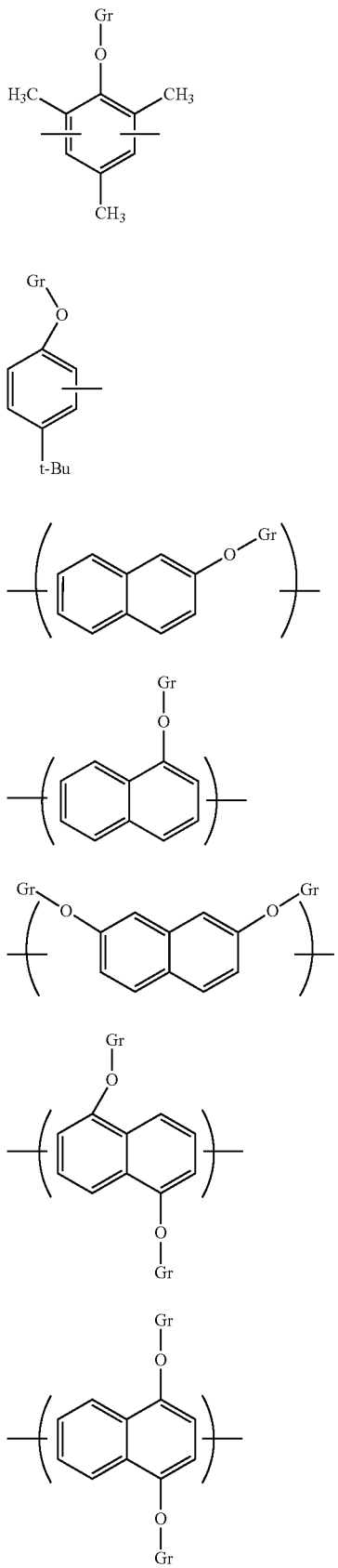

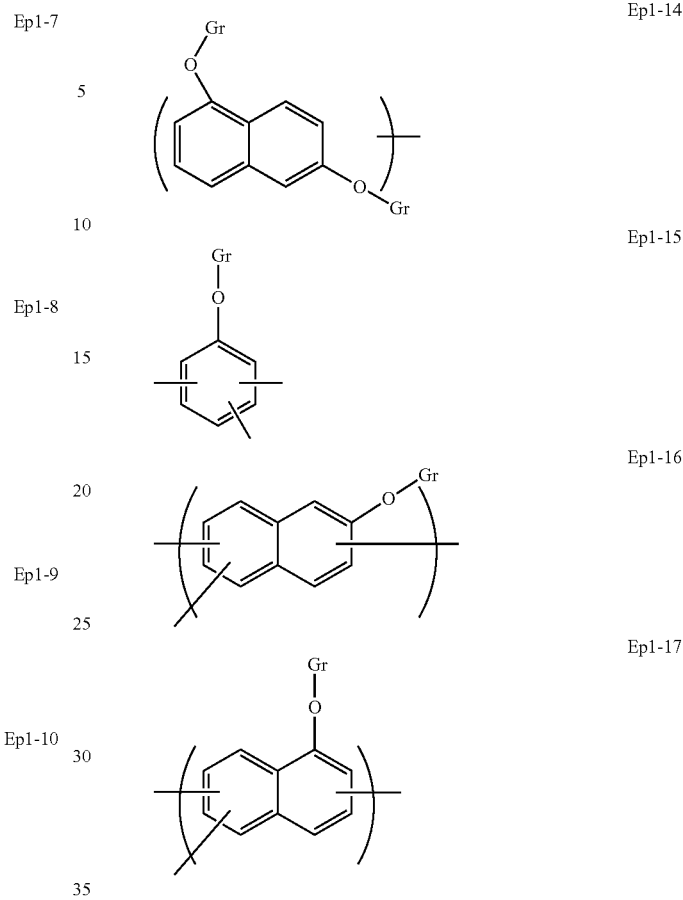

In the above structural formulae, "Gr" represents a glycidyl group. Among these structures, regarding those having two or more positions of bonding to other structural moieties on a naphthalene skeleton, the bonding positions may be located on the same nucleus or different nuclei.

In the present invention, among these, the aromatic hydrocarbon group represented by structural formula Ep1-1 is particularly preferable from the standpoint of good curability, and the aromatic hydrocarbon group represented by structural formula Ep1-4 is particularly preferable from the standpoint of good resistance to moisture and solder.

Next, as in the phenolic resin (B) in the thermosetting resin composition (I), examples of the divalent aralkyl group (X) included in the resin structure of the epoxy resin (A') include groups having structures represented by X1 to X5 above.

The epoxy resin (A') used in the thermosetting resin composition (II) of the present invention has a resin structure in which plural aromatic hydrocarbon groups selected from the group consisting of a naphthylmethyloxy group- or anthrylmethyloxy group-containing aromatic hydrocarbon group (ph1) and a glycidyloxy group-containing aromatic hydrocarbon group (ep) are bonded through a divalent aralkyl group (X). The form of these bonds may be any combination. When the naphthylmethyloxy group- or anthrylmethyloxy group-containing aromatic hydrocarbon group (ph1) is represented by "Ph1", the glycidyloxy group-containing aromatic skeleton (ep) is represented by "Ep1", and the divalent aralkyl group (X) is represented by "X", examples of the molecular structure of the epoxy resin constituted by these structural moieties include random copolymers and block copolymers including, as repeating units, structural moieties represented by partial structural formulae E1 and E2 below:

[Chem. 31]

-Ph1-X-   E1

-Ep1-X-   E2 polymers in which E1 is present in a molecular chain of a polymer block including E2 as a repeating unit, polymers including, as a branch point, a structural moiety represented by any of structural formulae E3 to E8 below in the resin structure,

[Chem. 32]

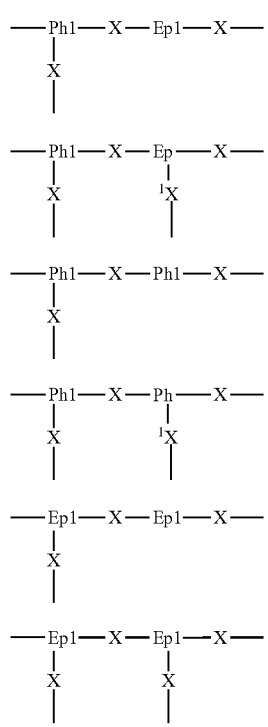

and polymers including any of these structural moieties as a repeating unit and having a structure represented by structural formula E9 or E10 below at an end of the resin structure.

[Chem. 33]

Ph1-X-   E9

Ep1-X-   E10

In the present invention, because of such a characteristic chemical structure, the aromatic content in the molecular structure is high and good heat resistance and good flame retardancy can be imparted to the resulting cured product. In particular, a resin in which the aromatic nucleus constituting the naphthylmethyloxy group- or anthrylmethyloxy group-containing aromatic hydrocarbon group (ph1) or the glycidyloxy group-containing aromatic hydrocarbon group (ep), which functions as a basic skeleton of the epoxy resin (A') of the present invention, is a phenyl group or an alkyl-substituted phenyl group is preferable from the standpoint that the effect of improving the resistance to moisture and solder is significant. The aromatic nucleus constituted by a phenyl group or an alkyl-substituted phenyl group provides the resulting cured product with toughness, and the fused polycyclic skeleton arranged as a side chain exhibits a low viscosity. Thus, the thermal expansion is low, the adhesiveness is improved, and the resistance to moisture and solder is markedly improved. In addition, frame retardancy can be improved.

Furthermore, the structural moiety bonded through the divalent aralkyl group (X) may include an alkoxy group-containing aromatic hydrocarbon group. Examples of the alkoxy group-containing aromatic hydrocarbon group include groups represented by structural formulae A1 to A13 below.

[Chem. 34]

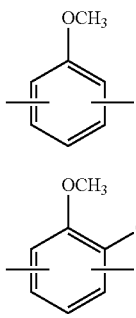   A1

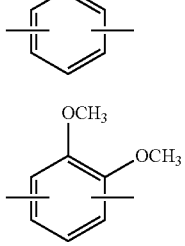   A2

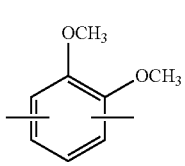   A3

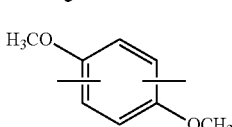   A4

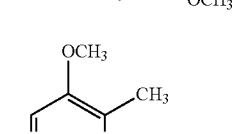   A5

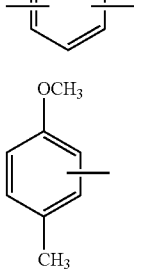   A6

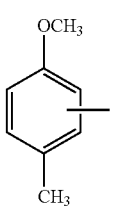   A7

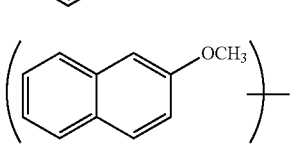   A8

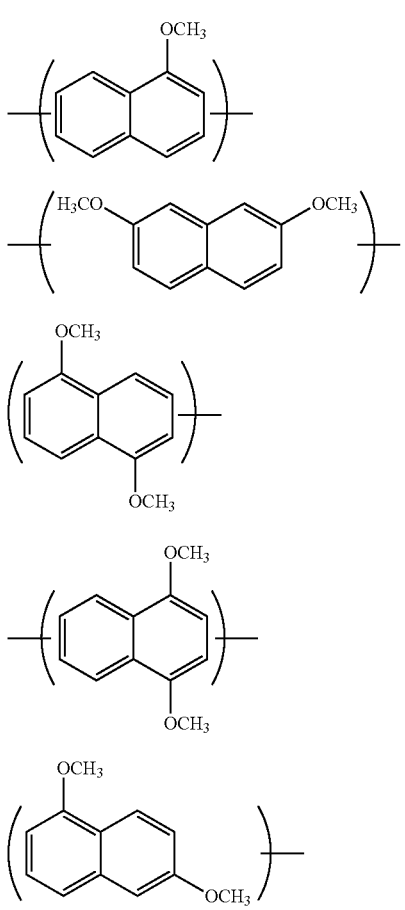

In the present invention, when the epoxy resin (A') includes an alkoxy group-containing aromatic hydrocarbon group in the resin structure thereof, the alkoxy group-containing aromatic hydrocarbon group preferably has the structure represented by structural formula A8 above from the standpoint that the resulting cured product of the epoxy resin has good heat resistance and good frame retardancy, and the dielectric loss tangent of the cured product can be significantly reduced.

The epoxy resin (A') preferably has an epoxy equivalent in the range of 173 to 700 g/eq. from the standpoint that heat resistance and flame retardancy of the resulting cured product are further improved.

Furthermore, the epoxy resin (A') has a melt viscosity preferably in the range of 0.1 to 100 dPa·s and particularly preferably in the range of 0.1 to 10 dPa·s at 150 degrees (Celsius) measured with an ICI viscometer from the standpoint of, for example, good fluidity during molding and good resistance of the resulting cured product to moisture and solder. An epoxy resin that satisfies the above conditions of the epoxy equivalent and the melt viscosity is the novel epoxy resin of the present invention. The epoxy equivalent is preferably in the range of 180 to 500 g/eq., and particularly preferably in the range of 200 to 400 g/eq. from the standpoint of a particularly good balance among the resistance of the cured product to moisture and solder, flame retardancy of the cured product, and curability of the composition.

The epoxy resin (A') can be produced by a method described in detail below. Specifically, the target epoxy resin can be produced by producing the phenolic resin (B) in the thermosetting resin composition (I) and then reacting the phenolic resin (B) with an epihalohydrin. An example of the method includes adding 2 to 10 moles of an epihalohydrin relative to 1 mole of a phenolic hydroxyl group in the phenolic resin (B), and allowing the resulting mixture to react at a temperature of 20 to 120 degrees (Celsius) for 0.5 to 10 hours while adding 0.9 to 2.0 moles of a basic catalyst relative to 1 mole of a phenolic hydroxyl group either at a time or gradually. This basic catalyst may be used in the form of solid or an aqueous solution. In the case where an aqueous solution is used, the basic catalyst may be continuously added, while water and the epihalohydrin are continuously distilled off from the reaction mixture under reduced pressure or normal pressure, and the reaction mixture may be further separated so that water is removed and the epihalohydrin is continuously returned to the reaction mixture.

In case of industrial production, although the whole epihalohydrin charged in an initial batch for production of an epoxy resin is new one, it is preferable to use the epihalohydrin recovered from the crude reaction product in combination with a new epihalohydrin in an amount corresponding to that consumed in the reaction in the following batch. In this case, an impurity, such as glycidol, derived by a reaction between the epihalohydrin and water, an organic solvent, or the like may be contained. Examples of the epihalohydrin used in this case include, but are not particularly limited to, epichlorohydrin, epibromohydrin, and β-methylepichlorohydrin. Among these epihalohydrins, epichlorohydrin is preferable because it is commercially available with ease.

Specific examples of the basic catalyst include alkaline earth metal hydroxides, alkali metal carbonates, and alkali metal hydroxides. Among these basic catalysts, alkali metal hydroxides are particularly preferable from the standpoint of high catalytic activity of the epoxy resin synthesis reaction, and examples thereof include sodium hydroxide and potassium hydroxide. In the use of the basic catalysts, these basic catalysts may be used in the form of an aqueous solution having a concentration of about 10% to 55% by mass or may be used in the form of solid. The reaction rate in the synthesis of the epoxy resin can be increased by using an organic solvent in combination. Examples of the organic solvent include, but are not particularly limited to, ketones such as acetone and methyl ethyl ketone; alcohols such as methanol, ethanol, 1-propyl alcohol, isopropyl alcohol, 1-butanol, secondary butanol, and tertiary butanol; cellosolves such as methyl cellosolve and ethyl cellosolve; ethers such as tetrahydrofuran, 1,4-dioxane, 1,3-dioxane, and diethoxyethane; and aprotic polar solvents such as acetonitrile, dimethyl sulfoxide, and dimethylformamide. These organic solvents may be used alone or in combination of two or more solvents so as to control polarity, as required.

After the reaction product of the epoxidation reaction is washed with water, the unreacted epihalohydrin and the organic solvent used in combination are distilled off by heating under reduced pressure. In order to further reduce the content of a hydrolyzable halogen in the epoxy resin, the resulting epoxy resin may be dissolved again in an organic solvent such as toluene, methyl isobutyl ketone, or methyl ethyl ketone, an aqueous solution of an alkali metal hydroxide such as sodium hydroxide or potassium hydroxide may be added to the resulting solution, and the reaction may then be further conducted. In this case, in order to further improve the reaction rate, the reaction may be conducted in the presence of a phase-transfer catalyst such as a quaternary ammonium salt or a crown ether. When the phase-transfer catalyst is used, the amount of phase-transfer catalyst used is preferably in the range of 0.1% to 3.0% by mass relative to the epoxy resin used. After the completion of the reaction, a produced salt is removed by filtering, washing with water, etc. and furthermore, the solvent such as toluene or methyl isobutyl ketone is distilled off by heating under reduced pressure. Thus, a high-purity epoxy resin can be produced.

In the thermosetting resin composition (II) of the present invention, the epoxy resin (A') may be used alone, or another epoxy resin (a') may be used in combination as long as the effects of the present invention are not impaired. In the case where the other epoxy resin (a') is used in combination, the ratio of the epoxy resin (A') of the present invention to the whole epoxy resin is preferably 30% by mass or more, and particularly preferably 40% by mass or more.

As the other epoxy resin (a'), which can be used in combination with the epoxy resin (A') of the present invention, various epoxy resins can be used. Examples thereof include naphthalene-type epoxy resins such as diglycidyloxynaphthalene, 1,1-bis(2,7-diglycidyloxynaphthyl)methane, and 1-(2,7-diglycidyloxynaphthyl)-1-(2'-glycidyloxynaphthyl)methane; bisphenol-type epoxy resins such as bisphenol A-type epoxy resins and bisphenol F-type epoxy resins; novolac-type epoxy resins such as phenol novolac-type epoxy resins, cresol novolac-type epoxy resins, bisphenol A novolac-type epoxy resins, naphthol-novolac-type epoxy resins, biphenyl novolac-type epoxy resins, naphthol-phenol co-condensed novolac-type epoxy resins, and naphthol-cresol co-condensed novolac-type epoxy resins; epoxy resins having a resin structure in which a methoxynaphthalene skeleton is bonded to an aromatic nucleus of any of the above novolac-type epoxy resins through a methylene group and epoxy resins having a resin structure in which a methoxyphenyl skeleton is bonded to an aromatic nucleus of any of the above novolac-type epoxy resins through a methylene group; phenol aralkyl-type epoxy resins represented by structural formula a1 below:

[Chem. 35]

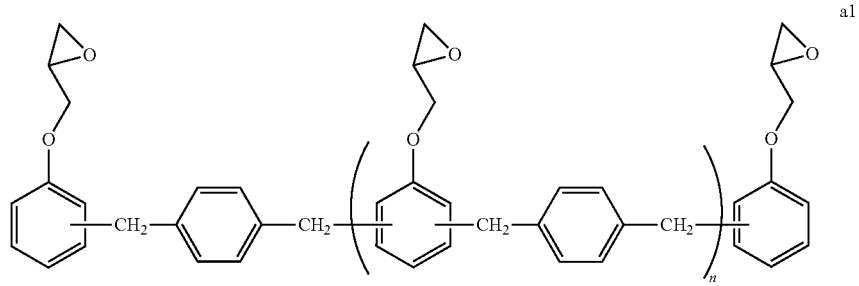

(where n represents the number of repeating units and is an integer of 0 or more),
naphthol aralkyl-type epoxy resins represented by structural formula a2 below:

[Chem. 36]

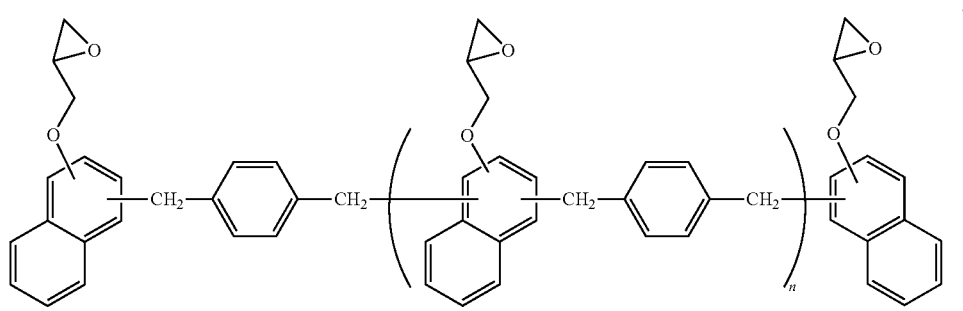

(where n represents the number of repeating units and is an integer of 0 or more),
biphenyl-type epoxy resins represented by structural formula a3 below:

[Chem. 37]

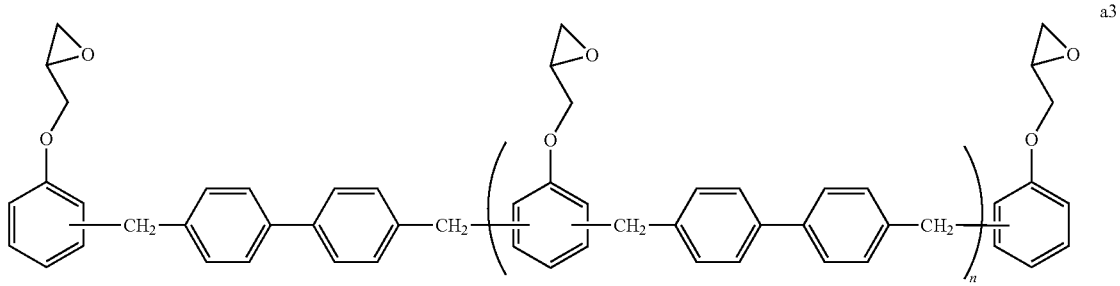

(where n represents the number of repeating units and is an integer of 0 or more),
and novolac-type epoxy resins that include an aromatic methylene as a linking group and that are represented by structural formula a4 below:

[Chem. 38]

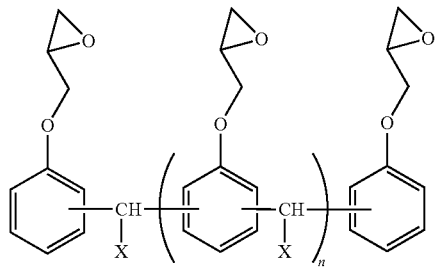

a4

(where X represents a phenyl group or a biphenyl group, and n represents the number of repeating units and is an integer of 0 or more);
epoxy resins having a resin structure in which a methoxynaphthalene skeleton is bonded to an aromatic nucleus of any of the above aralkyl-type epoxy resins through a methylene group and epoxy resins having a resin structure in which a methoxyphenyl skeleton is bonded to an aromatic nucleus of any of the aralkyl-type epoxy resins through a methylene group; tetramethylbiphenyl-type epoxy resins, triphenylmethane-type epoxy resins, tetraphenylethane-type epoxy resins, and dicyclopentadiene-phenol addition reaction-type epoxy resins. These epoxy resins may be used alone or in combination of two or more resins.

Among these, naphthalene-type epoxy resins, naphthol-novolac-type epoxy resins, phenol aralkyl-type epoxy resins, biphenyl-type epoxy resins, alkoxy group-containing novolac-type epoxy resins, and alkoxy group-containing aralkyl-type epoxy resins are particularly preferable from the standpoint of good flame retardancy and good dielectric properties.

As the curing agent (B') used in the thermosetting resin composition (II) of the present invention, for example, curing agents such as amine compounds, amide compounds, acid anhydride compounds, and phenolic compounds can be used. Specific examples of the amine compound include diaminodiphenylmethane, diethylenetriamine, triethylenetetramine, diaminodiphenylsulfone, isophoronediamine, imidazole, $BF_3$-amine complexes, and guanidine derivatives. Specific examples of the amide compound include dicyandiamide, and a polyamide resin synthesized from a dimer of linolenic acid and ethylenediamine. Specific examples of the acid anhydride compound include phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride. Specific examples of the phenolic compound include novolac resins such as phenol novolac resins, cresol novolac resins, naphthol novolac resins, naphthol-phenol co-condensed novolac resins, and naphthol-cresol co-condensed novolac resins; and methoxy aromatic structure-containing phenolic resins such as phenolic resins having a resin structure in which a methoxynaphthalene skeleton is bonded to an aromatic nucleus of any of the above novolac resins through a methylene group and phenolic resins having a resin structure in which a methoxyphenyl skeleton is bonded to an aromatic nucleus of any of the above novolac resins through a methylene group; aralkyl-type phenolic resins such as phenol aralkyl resins represented by the structural formula below:

[Chem. 39]

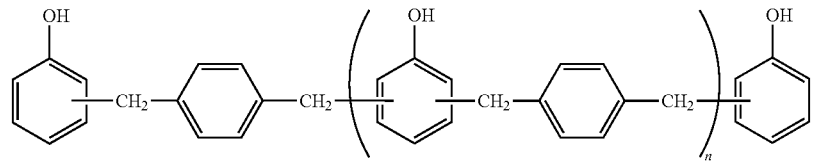

(where n represents the number of repeating units and is an integer of 0 or more),
naphthol aralkyl resins represented by the structural formula below:

[Chem. 40]

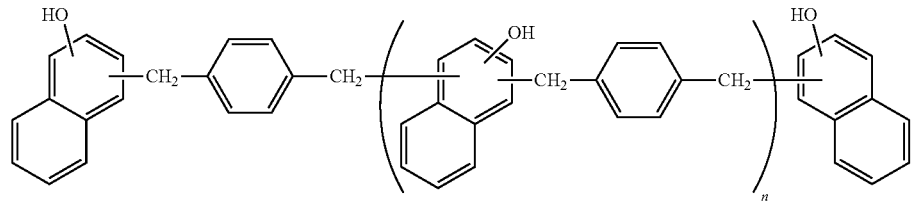

(where n represents the number of repeating units and is an integer of 0 or more),
biphenyl-modified phenolic resins represented by the structural formula below:

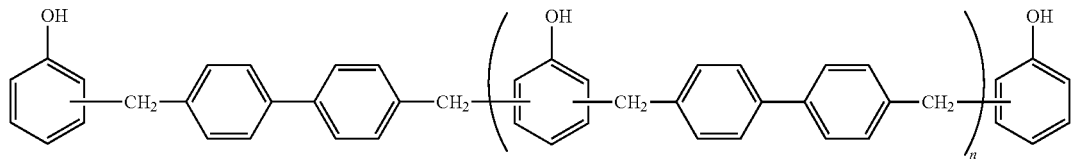

[Chem. 41]

(where n represents the number of repeating units and is an integer of 0 or more),
and biphenyl-modified naphthol resins represented by the structural formula below:

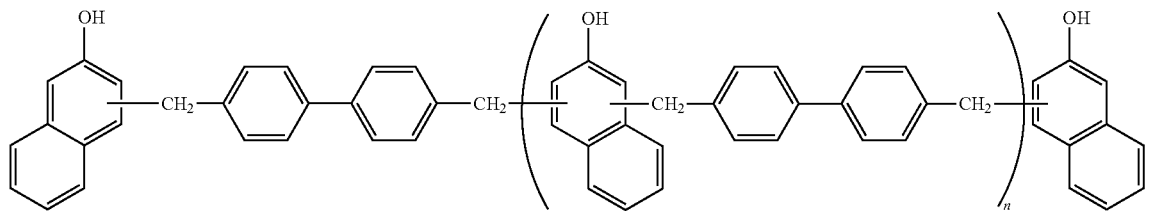

[Chem. 42]

(where n represents the number of repeating units and is an integer of 0 or more);
phenolic resins having a resin structure in which a methoxynaphthalene skeleton is bonded to an aromatic nucleus of any of the above aralkyl-type phenolic resins through a methylene group and phenolic resins having a resin structure in which a methoxyphenyl skeleton is bonded to an aromatic nucleus of any of the above aralkyl-type phenolic resins through a methylene group;
novolac resins that include an aromatic methylene as a linking group and that are represented by the structural formula below:

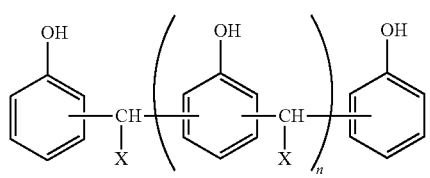

[Chem. 43]

(where X represents a phenyl group or a biphenyl group, and n represents the number of repeating units and is an integer of 0 or more); trimethylolmethane resins, tetraphenylolethane resins, dicyclopentadiene-phenol addition reaction-type phenolic resins, and polyhydric phenol compounds such as aminotriazine-modified phenolic resins (polyhydric phenolic compounds in which phenol nuclei are joined by melamine, benzoguanamine, or the like).

Among these, resins having a large number of aromatic skeletons in its molecular structure are particularly preferable from the standpoint of the flame-retardant effect. Specifically, phenol novolac resins, cresol novolac resins, novolac resins that include an aromatic methylene as a linking group, phenol aralkyl resins, naphthol aralkyl resins, naphthol novolac resins, naphthol-phenol co-condensed novolac resins, naphthol-cresol co-condensed novolac resins, biphenyl-modified phenolic resins, biphenyl-modified naphthol resins, methoxy aromatic structure-containing phenolic resins, and aminotriazine-modified phenolic resins are preferable from the standpoint of good flame retardancy.

From the standpoint of high fluidity, dihydroxyphenols such as resorcin, catechol, and hydroquinone, bisphenols such as bisphenol F and bisphenol A; and dihydroxynaphthalenes such as 2,7-dihydroxynaphthalene and 1,6-dihydroxynaphthalene are preferably used in combination.

However, in the present invention, the phenolic resin (B) used in the thermosetting resin composition (I) described above is particularly preferable because the effect of improving heat resistance and resistance to moisture and solder is significant. Furthermore, the phenolic resin preferably includes a naphthylmethyloxy group- or anthrylmethyloxy group-containing aromatic hydrocarbon group (ph1) represented by Ph1-14, Ph1-15, Ph1-20, or Ph1-22, the aromatic hydrocarbon group having a naphthylmethyloxy group or an anthrylmethyloxy group in the aromatic nucleus thereof; a phenolic hydroxyl group-containing aromatic skeleton (Ph2) represented by Ph2-1 or Ph2-4, the aromatic hydrocarbon group not having a naphthylmethyloxy group or an anthrylmethyloxy group in the aromatic nucleus thereof; and a divalent aralkyl group (X) represented by X1, X2, or X5 from the standpoint of good resistance to moisture and solder.

The amounts of the epoxy resin (A') and the curing agent (B') blended in the thermosetting resin composition (II) of the present invention are not particularly limited. The amount of active group in the curing agent is preferably 0.7 to 1.5 equivalents relative to 1 equivalent of the total epoxy groups in epoxy resins containing the epoxy resin because the resulting cured product has good properties.

A curing accelerator may be used in combination with the thermosetting resin composition (II) of the present invention, as required. Various curing accelerators can be used and examples thereof include phosphorus compounds, tertiary amines, imidazoles, organic acid metal salts, Lewis acids, and amine complex salts. When the thermosetting resin composition (II) is used in semiconductor sealing materials, phosphorus compounds such as triphenylphosphine and tertiary amines such as 1,8-diazabicyclo-[5.4.0]-undecene (DBU) are preferable from the standpoint of good curability, heat resistance, electrical properties, resistance to moisture and solder, etc.

Regarding the thermosetting resin compositions (I) and (II) of the present invention described in detail above, since the phenolic resin (B) in the thermosetting resin composition (I) or the epoxy resin (A') in the thermosetting resin composition (II) has an effect of imparting good flame retardancy, the resulting cured product has satisfactory flame retardancy even if a commonly used flame retardant is not incorporated. However, in order to exhibit a higher degree of flame retardancy, a halogen-free flame retardant (C) that contains substantially no halogen atom may be incorporated in the field of, for example, semiconductor sealing materials as long as moldability in a sealing step and reliability of a semiconductor device are not deteriorated.

The thermosetting resin compositions (I) and (II) containing the halogen-free flame retardant (C) substantially contain no halogen atom, but may contain a trace amount, e.g., about 5,000 ppm or less of halogen atoms of impurities derived from, for example, an epihalohydrin contained in the epoxy resin.

Examples of the halogen-free flame retardant (C) include phosphorus-based flame retardants, nitrogen-based flame retardants, silicone-based flame retardants, inorganic flame retardants, and organic metal salt-based flame retardants. The use of these flame retardants is also not particularly limited. These flame retardants may be used alone. Alternatively, a plurality of the same type of flame retardants may be used in combination or different types of flame retardants may be used in combination.

The phosphorus-based flame retardant may be an inorganic compound or an organic compound. Examples of the inorganic compound include red phosphorus; ammonium phosphates such as monoammonium phosphate, diammonium phosphate, triammonium phosphate, and ammonium polyphosphate; and inorganic nitrogen-containing phosphorus compounds such as phosphoric amide.

The red phosphorus is preferably subjected to a surface treatment for the purpose of preventing hydrolysis etc. Examples of the surface treatment method include (i) a method of coating red phosphorus with an inorganic compound such as magnesium hydroxide, aluminum hydroxide, zinc hydroxide, titanium hydroxide, bismuth oxide, bismuth hydroxide, bismuth nitrate, or a mixture thereof; (ii) a method of coating red phosphorus with a mixture of an inorganic compound such as magnesium hydroxide, aluminum hydroxide, zinc hydroxide, or titanium hydroxide, and a thermosetting resin such as a phenolic resin; and (iii) a method of coating red phosphorus with a coating film composed of an inorganic compound such as magnesium hydroxide, aluminum hydroxide, zinc hydroxide, or titanium hydroxide and further coating the coating film with a thermosetting resin such as a phenolic resin.

Examples of the organic phosphorus-based compound include common organic phosphorus-based compounds such as phosphoric acid ester compounds, phosphonic acid compounds, phosphinic acid compounds, phosphine oxide compounds, phosphorane compounds, and organic nitrogen-containing phosphorus compounds; cyclic organic phosphorus compounds such as 9,10-dihydro-9-oxa-10-phosphaphenanthrene=10-oxide, 10-(2,5-dihydroxyphenyl)-10H-9-oxa-10-phosphaphenanthrene=10-oxide, and 10-(2,7-dihydroxynaphthyl)-10H-9-oxa-10-phosphaphenanthrene=10-oxide; and derivatives obtained by reacting any of these compounds with a compound such as an epoxy resin or a phenolic resin.

The amount of phosphorus-based flame retardant blended is appropriately selected in accordance with the type of phosphorus-based flame retardant, other components of the thermosetting resin composition, and the degree of desired flame retardancy. When red phosphorus is used as the halogen-free flame retardant, for example, the amount is preferably in the range of 0.1 to 2.0 parts by mass relative to 100 parts by mass of the thermosetting resin composition containing all components such as an epoxy resin, a curing agent, a halogen-free flame retardant, and other fillers and additives. Similarly, when an organic phosphorus-based compound is used, the amount is preferably in the range of 0.1 to 10.0 parts by mass, and particularly preferably in the range of 0.5 to 6.0 parts by mass.

When the phosphorus-based flame retardant is used, the phosphorus-based flame retardant may be used in combination with hydrotalcite, magnesium hydroxide, a boron compound, zirconium oxide, a black dye, calcium carbonate, zeolite, zinc molybdate, activated carbon, or the like.

Examples of the nitrogen-based flame retardant include triazine compounds, cyanuric acid compounds, isocyanuric acid compounds, and phenothiazine. Among these, triazine compounds, cyanuric acid compounds, and isocyanuric acid compounds are preferable.

Examples of the triazine compound include melamine, acetoguanamine, benzoguanamine, melon, melam, succinoguanamine, ethylenedimelamine, polyphosphoric acid melamine, triguanamine; (i) aminotriazine sulfate compounds such as guanylmelamine sulfate, melem sulfate, and melam sulfate; (ii) cocondensates of a phenolic compound such as phenol, cresol, xylenol, butylphenol, or nonylphenol, a melamine such as melamine, benzoguanamine, acetoguanamine, or formguanamine, and formaldehyde; (iii) mixtures of any of the above cocondensates (ii) and a phenolic resin such as a phenol-formaldehyde condensate; and (iv) compounds obtained by further modifying any of the above (ii) and (iii) with tung oil, isomerized linseed oil, or the like.

Specific examples of the cyanuric acid compound include cyanuric acid and cyanuric acid melamine.

The amount of nitrogen-based flame retardant blended is appropriately selected in accordance with the type of nitrogen-based flame retardant, other components of the thermosetting resin composition, and the degree of desired flame retardancy. For example, the amount of nitrogen-based flame retardant is preferably in the range of 0.05 to 10 parts by mass and particularly preferably in the range of 0.1 to 5 parts by mass relative to 100 parts by mass of the thermosetting resin composition containing all components such as an epoxy resin, a curing agent, a halogen-free flame retardant, and other fillers and additives.

The nitrogen-based flame retardant may be used in combination with, for example, a metal hydroxide or a molybdenum compound.

The silicone-based flame retardant is not particularly limited, and any organic compound containing a silicon atom may be used. Examples thereof include silicone oil, silicone rubber, and silicone resins.

The amount of silicone-based flame retardant blended is appropriately selected in accordance with the type of silicone-based flame retardant, other components of the thermosetting resin composition, and the degree of desired flame retardancy. For example, the amount of silicone-based flame retardant is preferably in the range of 0.05 to 20 parts by mass relative to 100 parts by mass of the thermosetting resin composition containing all components such as an epoxy resin, a curing agent, a halogen-free flame retardant, and other fillers and additives. The silicone-based flame retardant may be used in combination with, for example, a molybdenum compound or alumina.

Examples of the inorganic flame retardant include metal hydroxides, metal oxides, metal carbonate compounds, metal powders, boron compounds, and low-melting glass.

Specific examples of the metal hydroxide include aluminum hydroxide, magnesium hydroxide, dolomite, hydrotalcite, calcium hydroxide, barium hydroxide, and zirconium hydroxide.

Specific examples of the metal oxide include zinc molybdate, molybdenum trioxide, zinc stannate, tin oxide, aluminum oxide, iron oxide, titanium oxide, manganese oxide, zirconium oxide, zinc oxide, molybdenum oxide, cobalt oxide, bismuth oxide, chromium oxide, nickel oxide, copper oxide, and tungsten oxide.

Specific examples of the metal carbonate compound include zinc carbonate, magnesium carbonate, calcium carbonate, barium carbonate, basic magnesium carbonate, aluminum carbonate, iron carbonate, cobalt carbonate, and titanium carbonate.

Specific examples of the metal powder include powders of aluminum, iron, titanium, manganese, zinc, molybdenum, cobalt, bismuth, chromium, nickel, copper, tungsten, and tin.

Specific examples of the boron compound include zinc borate, zinc metaborate, barium metaborate, boric acid, and borax.

Specific examples of the low-melting glass include CEEPREE (Bokusui Brown Co., Ltd.), hydrated glass $SiO_2$—$MgO$-$H_2O$, $PbO$—$B_2O_3$-based, $ZnO$-$P_2O_5$—$MgO$-based, $P_2O_5$—$B_2O_3$—$PbO$—$MgO$-based, $P$—$Sn$—$O$—$F$-based, $PbO$-$V_2O_5$—$TeO_2$-based, and $Al_2O_3$—$H_2O$-based glassy compounds, and lead borosilicate glassy compounds.

The amount of inorganic flame retardant blended is appropriately selected in accordance with the type of inorganic flame retardant, other components of the thermosetting resin composition, and the degree of desired flame retardancy. For example, the amount of inorganic flame retardant is preferably in the range of 0.05 to 20 parts by mass, and particularly preferably in the range of 0.5 to 15 parts by mass relative to 100 parts by mass of the thermosetting resin composition containing all components such as an epoxy resin, a curing agent, a halogen-free flame retardant, and other fillers and additives.

Examples of the organic metal salt-based flame retardant include ferrocene, acetylacetonate metal complexes, organometallic carbonyl compounds, organic cobalt salt compounds, organic sulfonic acid metal salts, and compounds in which a metal atom and an aromatic compound or a heterocyclic compound are ionic-bonded or coordinate-bonded.

The amount of organic metal salt-based flame retardant blended is appropriately selected in accordance with the type of organic metal salt-based flame retardant, other components of the thermosetting resin composition, and the degree of desired flame retardancy. For example, the amount of organic metal salt-based flame retardant is preferably in the range of 0.005 to 10 parts by mass relative to 100 parts by mass of the thermosetting resin composition containing all components such as an epoxy resin, a curing agent, a halogen-free flame retardant, and other fillers and additives.

The thermosetting resin compositions (I) and (II) of the present invention may contain inorganic fillers, as required. Examples of the inorganic filler include fused silica, crystalline silica, alumina, silicon nitride, and aluminum hydroxide. When a particularly large amount of inorganic filler is blended, fused silica is preferably used. Crushed or spherical fused silica may be used. In order to increase the amount of fused silica blended and to suppress an increase in melt viscosity of the resulting molding material, spherical fused silica is preferably used. In order to further increase the amount of spherical silica blended, the particle size distribution of the spherical silica is preferably appropriately adjusted. The filling ratio of the inorganic filler is preferably high from the standpoint of flame retardancy and is particularly preferably 65% by mass or more relative to the total amount of the thermosetting resin composition (I) or (II). When the thermosetting resin composition is used as a conductive paste or the like, conductive fillers such as a silver powder and a copper powder may be used.

The thermosetting resin composition (I) or (II) of the present invention may contain various compounding agents such as silane coupling agents, mold-releasing agents, pigments, and emulsifiers, as required.

The thermosetting resin composition (I) or (II) of the present invention is obtained by uniformly mixing the components described above. The thermosetting resin composition of the present invention can be easily converted into a cured product by the same method as a known method. Examples of the cured product include formed cured products such as a laminate, a cast product, an adhesive layer, a coating film, and a film.

Examples of the application of the thermosetting resin composition (I) or (II) of the present invention include semiconductor sealing materials; resin compositions used for a laminated sheet, an electronic circuit board, or the like; resin casting materials; adhesives; interlayer insulating materials for built-up substrates; and coating materials such as an insulating coating material. In particular, the thermosetting resin composition (I) or (II) is suitably used as semiconductor sealing materials.

In order to prepare a thermosetting resin composition (I) or (II) for a semiconductor sealing material, the above-described components including a filler are sufficiently mixed using an extruder, a kneader, a roll, or the like until the resulting mixture becomes uniform, thus obtaining a melt-mixing type thermosetting resin composition. In such a case, silica is usually used as the filler. The filling ratio of the filler is preferably in the range of 30% to 95% by mass relative to 100 parts by mass of the thermosetting resin composition. The filling ratio of the filler is particularly preferably 70 parts by mass or more in order to improve flame retardancy, moisture resistance, and solder cracking resistance and to decrease a coefficient of linear expansion. When the filling ratio of the filler is 80 parts by mass or more, these effects are further enhanced. Semiconductor package molding is conducted by a method including casting or molding the composition using a transfer molding machine, an injection molding machine, or the like and heating the resulting product at 50 to 200 degrees (Celsius) for 2 to 10 hours to produce a semiconductor device which is a molded product.

In order to prepare the thermosetting resin composition (I) or (II) of the present invention used as a composition for a printed circuit board, for example, a varnish of the thermosetting resin composition is preferably prepared using an organic solvent, and the varnish is used as a resin composition for a prepreg. As the organic solvent, polar solvents having a boiling point of 160 degrees (Celsius) or lower, such as methyl ethyl ketone, acetone, and dimethylformamide are preferably used. These organic solvents may be used alone or as a mixed solvent of two or more organic solvents. A prepreg, which is a cured product, can be obtained by impregnating a reinforcing substrate such as paper, glass cloth, glass nonwoven fabric, aramid paper, aramid cloth, glass mat, or glass roving cloth with the resulting varnish, and heating the substrate at a heating temperature suitable for the type of solvent used, preferably 50 to 170 degrees (Celsius). A mass ratio of the resin composition to the reinforcing substrate used in this case is not particularly limited. In general, the prepreg is preferably prepared so that the resin content in the prepreg is in the range of 20% to 60% by mass. In the case where a copper clad laminate is produced by using the thermosetting resin composition (I) or (II), the copper clad laminate is obtained by laminating the prepregs thus prepared using a common method, appropriately stacking a copper foil, and conducting thermal pressure bonding at 170 to 250 degrees (Celsius) at a pressure of 1 to 10 MPa for 10 minutes to 3 hours.

When the thermosetting resin composition (I) or (II) of the present invention is used as a resist ink, for example, the following method may be employed. A cationic polymerization catalyst is used as a curing agent of the thermosetting resin composition (II), a pigment, talc, and a filler are further added to the resin composition to prepare a composition for a resist ink, the composition is then applied onto a printed board by screen printing, and a resist ink cured product is then obtained.

When the thermosetting resin composition (I) or (II) of the present invention is used as a conductive paste, for example, the following methods may be employed. Fine conductive particles are dispersed in the thermosetting resin composition to prepare a composition for an anisotropic conductive film. Alternatively, fine conductive particles are dispersed in the thermosetting resin composition to prepare a paste resin composition for circuit connection or an anisotropic conductive adhesive, which is liquid at room temperature.

An interlayer insulating material for a built-up substrate is obtained from the thermosetting resin composition (I) or (II) of the present invention by, for example, the following method. The thermosetting resin composition containing, as required, rubber, a filler, etc. is applied onto a wiring board having a circuit thereon by a spray coating method, a curtain coating method, or the like, and then cured. Subsequently, if necessary, predetermined through-holes etc. are formed in the wiring board, the wiring board is then treated with a roughening agent, washed with hot water to form irregularities on the surface thereof, and then subjected to a plating treatment to form a metal layer such as a copper layer. The plating method is preferably an electroless plating method or an electrolytic plating method. Examples of the roughening agent include oxidizing agents, alkali, and organic solvents. A built-up substrate can be produced by repeating such an operation as required, to alternately build up resin insulating layers and conductor layers having a predetermined circuit pattern. The through-holes are formed after the formation of an outermost resin insulating layer. Alternatively, a copper foil with a resin prepared by semi-curing the resin composition on the copper foil may be pressure-bonded on a wiring board having a circuit thereon under heating at 170 to 250 degrees (Celsius). Thus, a built-up substrate can be produced without performing the step of forming a roughened surface and the step of conducting a plating treatment.

A cured product of the present invention may be obtained in accordance with a common method for curing a thermosetting epoxy resin composition. For example, the heating temperature conditions may be appropriately selected in accordance with the type of curing agent that is used in combination, the application of the cured product, etc. The composition prepared by the above method may be heated in a temperature range of about 20 to 250 degrees (Celsius). Regarding a molding method etc., common methods for molding an epoxy resin composition etc. are employed, and thus conditions specific to the thermosetting resin composition (I) or (II) of the present invention are not particularly necessary.

Accordingly, in the present invention, it is possible to obtain an environmentally safe epoxy resin material that can exhibit high flame retardancy without using a halogen-based flame retardant. Furthermore, good dielectric properties of the epoxy resin material can realize a high operation speed of a high-frequency device. The phenolic resin (B) or the epoxy resin (A') can be easily produced by the method of the present invention with a high efficiency, and it becomes possible to perform molecular design in accordance with the levels of the desired properties.

EXAMPLES

The present invention will now be specifically described by way of Examples and Comparative Examples. In the description below, "part" and "%" are on a mass basis unless otherwise specified. A melt viscosity at 150 degrees (Celsius), gel permeation chromatography (GPC), a nuclear magnetic resonance (NMR) spectrum, and a mass (MS) spectrum were measured under the conditions below.

1) Melt viscosity at 150 degrees (Celsius): The melt viscosity was measured in accordance with ASTM D4287.
2) Method for measuring softening point: JIS K7234
3) GPC:
   Apparatus: HLC-8220 GPC, manufactured by Tosoh Corporation, Column: TSK-GEL G2000HXL+G2000HXL+G3000HXL+G4000HXL, manufactured by Tosoh Corporation
   Solvent: tetrahydrofuran
   Flow rate: 1 mL/min
   Detector: refractive index (RI) detector
4) NMR: NMR GSX270 manufactured by JEOL, Ltd.
5) MS: double-focusing mass spectrometer AX505H (FD505H), manufactured by JEOL, Ltd.

Example 1

Synthesis of phenolic resin (A-1)

In a flask equipped with a thermometer, a condenser tube, a distilling tube, a nitrogen gas-introducing tube, and a stirrer, 168.0 g (hydroxyl group: 1.00 equivalent) of a phenol aralkyl resin ("XLC-4L" manufactured by Mitsui Chemicals, Inc.), 45.9 g (0.26 moles) of 1-chloromethyl naphthalene, and 300.0 g of methyl isobutyl ketone were charged while nitrogen gas was purged, and the resulting mixture was stirred at room temperature while nitrogen was blown. The temperature was increased to 60 degrees (Celsius), and 23.3 g (0.29 moles) of an aqueous 49% sodium hydroxide solution was then added dropwise to the mixture over a period of one hour. After the completion of the addition, the temperature was increased, and the mixture was allowed to react at 70 degrees (Celsius) for two hours, at 95 degrees (Celsius) for two hours, and further for five hours while the mixture was refluxed. After the completion of the reaction, the temperature was decreased to 80 degrees (Celsius), the organic layer was washed with 100 g of water, and this water washing was repeated four times. Subsequently, methyl isobutyl ketone was removed by heating under reduced pressure. Thus, a phenolic resin (A-1) was prepared. The resulting phenolic resin had a softening point of 72 degrees (Celsius) (B & R method), a melt viscosity (measuring method: ICI viscometer method, measuring temperature: 150 degrees (Celsius)) of 1.3 dPa·s, and a hydroxyl equivalent of 276 g/eq.

Figure 2:
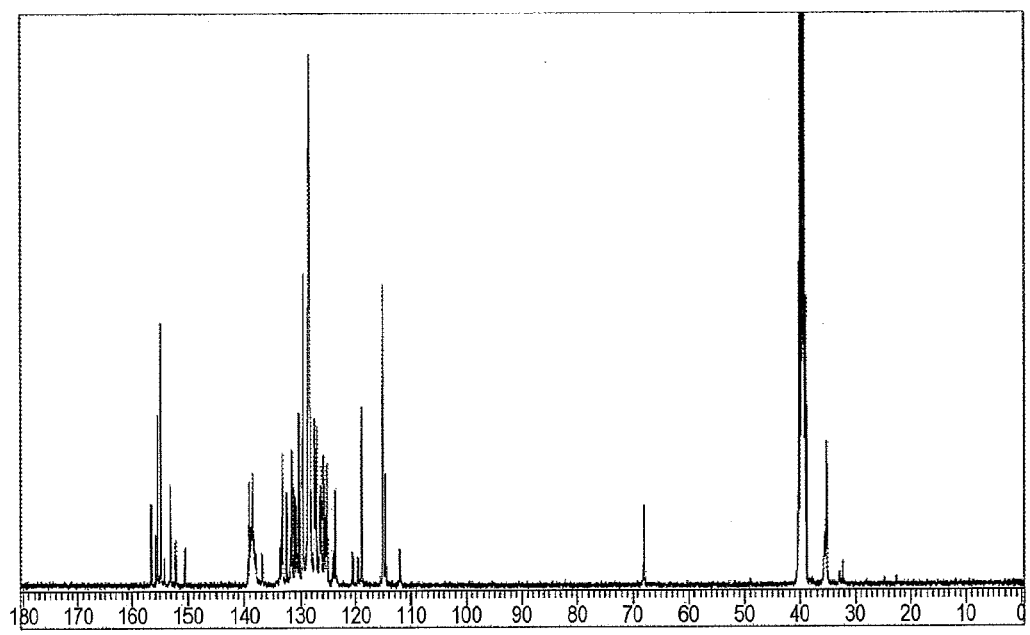
FIG. 2 is a $C^{13}$-NMR chart of the phenolic resin (A-1) prepared in Example 1.
Figure 3:
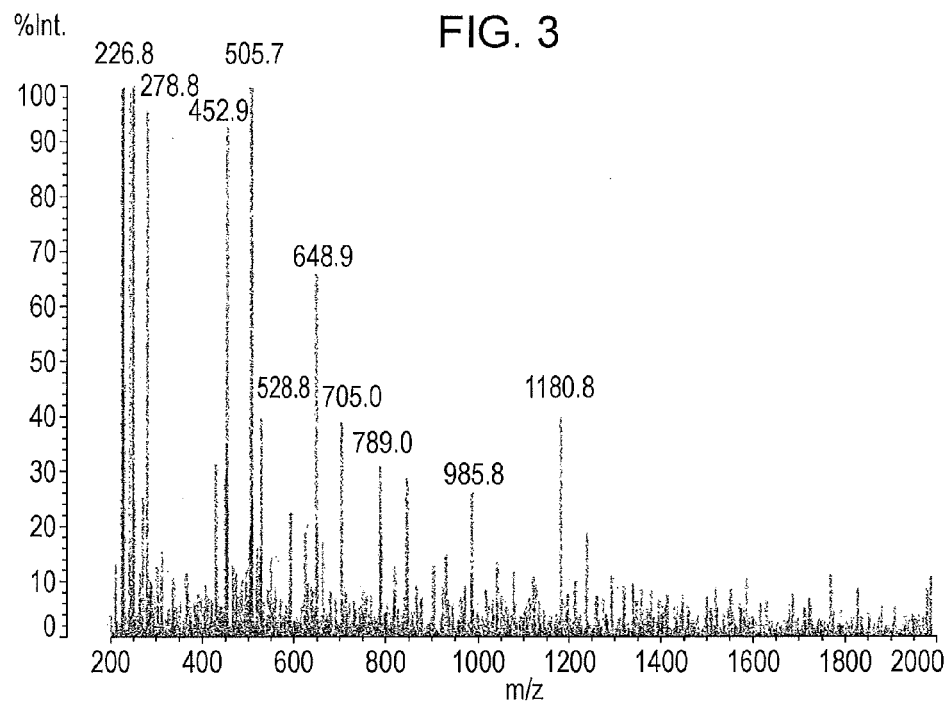
FIG. 3 is a MS spectrum of the phenolic resin (A-1) prepared in Example 1.

A GPC chart of the prepared phenolic resin is shown in FIG. 1, a $C^{13}$-NMR chart of the phenolic resin is shown in FIG. 2, and a MS spectrum of the phenolic resin is shown in FIG. 3. The presence of a naphthylmethyloxy group was confirmed by the above analysis. The ratio of a phenolic hydroxyl group to a naphthylmethyloxy group or an anthrylmethyloxy group was 74:26.

Example 2

Synthesis of Phenolic Resin (A-2)

A phenolic resin (A-2) was prepared as in Example 1 except that 28.3 g (0.16 moles) of 1-chloromethyl naphthalene and 14.4 g (0.18 moles) of an aqueous 49 mass % sodium hydroxide solution were used. The resulting phenolic resin had a softening point of 70 degrees (Celsius) (B & R method), a melt viscosity (measuring method: ICI viscometer method, measuring temperature: 150 degrees (Celsius)) of 1.1 dPa·s, and a hydroxyl equivalent of 227 g/eq.

Figure 4:
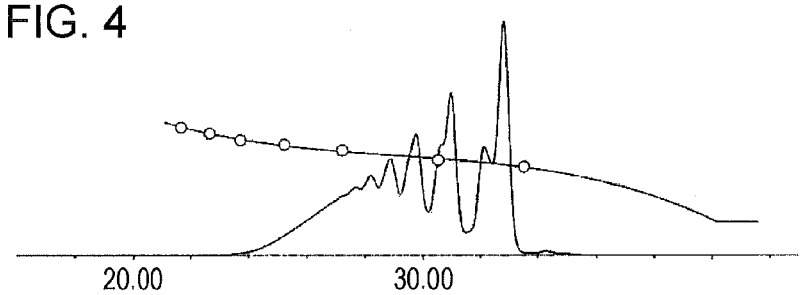
FIG. 4 is a GPC chart of a phenolic resin (A-2) prepared in Example 2.

A GPC chart of the prepared phenolic resin is shown in FIG. 4. The ratio of a phenolic hydroxyl group to a naphthylmethyloxy group or an anthrylmethyloxy group was 84:16.

Example 3

Synthesis of Phenolic Resin (A-3)

A phenolic resin (A-3) was prepared as in Example 1 except that 14.1 g (0.08 moles) of 1-chloromethyl naphthalene and 7.2 g (0.09 moles) of an aqueous 49% sodium hydroxide solution were used. The resulting phenolic resin had a softening point of 68 degrees (Celsius) (B & R method), a melt viscosity (measuring method: ICI viscometer method, measuring temperature: 150 degrees (Celsius)) of 1.0 dPa·s, and a hydroxyl equivalent of 195 g/eq.

Figure 5:
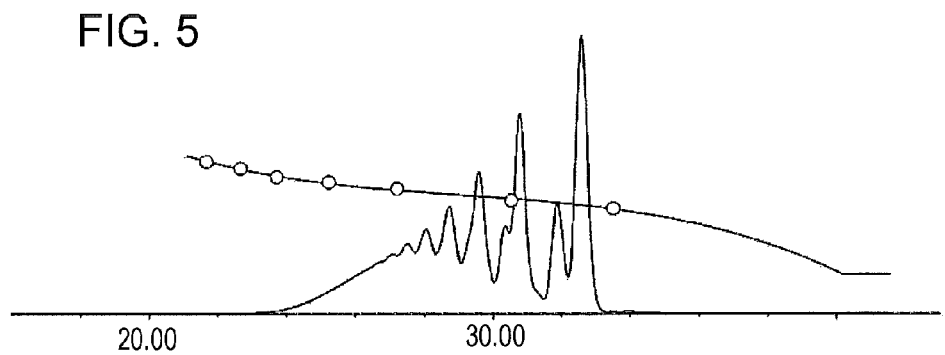
FIG. 5 is a GPC chart of a phenolic resin (A-3) prepared in Example 3.

A GPC chart of the prepared phenolic resin is shown in FIG. 5. The ratio of a phenolic hydroxyl group to a naphthylmethyloxy group or an anthrylmethyloxy group was 92:8.

Example 4

Synthesis of phenolic resin (A-4)

Figure 6:
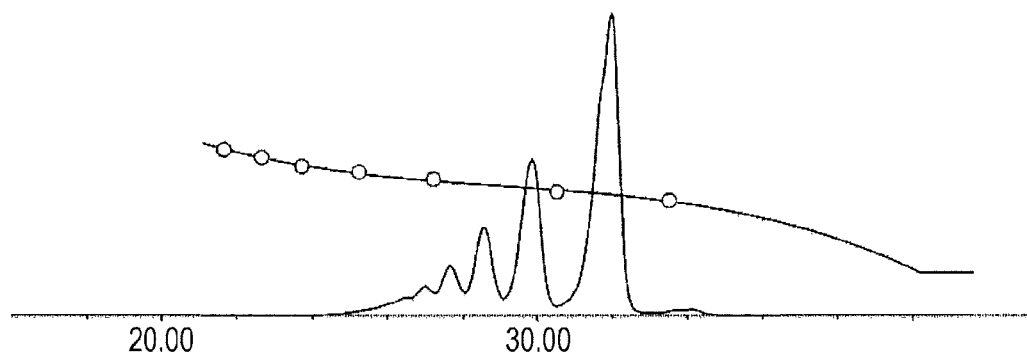
FIG. 6 is a GPC chart of a phenolic resin (A-4) prepared in Example 4.
Figure 7:
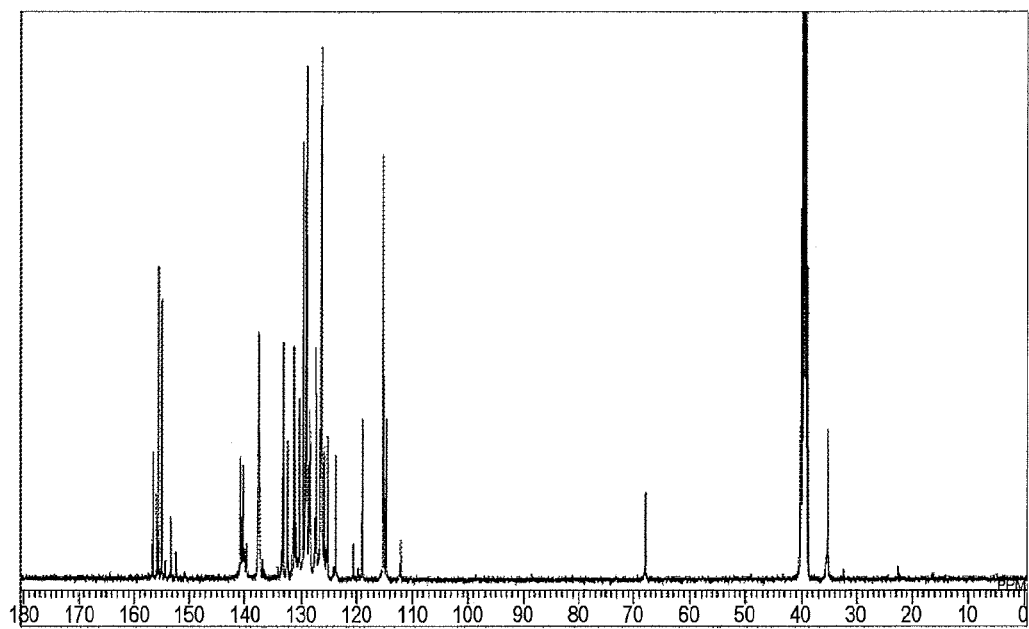
FIG. 7 is a $C^{13}$-NMR chart of the phenolic resin (A-4) prepared in Example 4.
Figure 8:
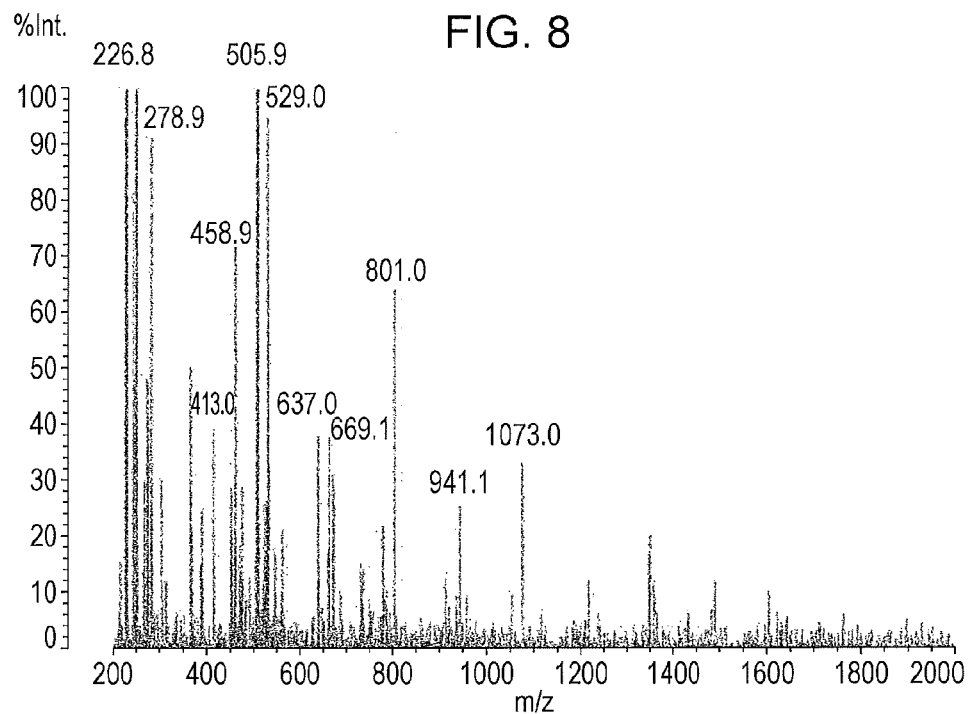
FIG. 8 is a MS spectrum of the phenolic resin (A-4) prepared in Example 4.

A phenolic resin (A-4) was prepared as in Example 1 except that 200.0 g (hydroxyl group: 1 equivalent) of a biphenyl novolac resin ("MEH-7851SS" manufactured by Meiwa Plastic Industries, Ltd.) was used instead of the phenol aralkyl resin ("XLC-4L" manufactured by Mitsui Chemicals, Inc.), and 53.0 g (0.3 moles) of 1-chloromethyl naphthalene was used. The resulting phenolic resin had a softening point of 76 degrees (Celsius) (B & R method), a melt viscosity (measuring method: ICI viscometer method, measuring temperature: 150 degrees (Celsius)) of 1.4 dPa·s, and a hydroxyl equivalent of 351 g/eq. A GPC chart of the prepared phenolic resin is shown in FIG. 6, a $C^{13}$-NMR chart of the phenolic resin is shown in FIG. 7, and a MS spectrum of the phenolic resin is shown in FIG. 8. The presence of a naphthylmethyloxy group was confirmed by the above analysis. The ratio of a phenolic hydroxyl group to a naphthylmethyloxy group or an anthrylmethyloxy group was 70:30.

Comparative Example 1

Synthesis of phenolic resin (A-5): phenolic resin described in PTL1

In a flask equipped with a thermometer, a dropping funnel, a condenser tube, a distilling tube, and a stirrer, 520 g (5.0 moles) of a phenol novolac resin ("PHENOLITE TD-2131" manufactured by DIC Corporation), 209 g (1.65 moles) of benzyl chloride, 1,094 g of methyl isobutyl ketone, and 7 g of tetraethylammonium chloride were charged, and the resulting mixture was stirred at room temperature while nitrogen was blown. Next, 149 g (1.82 moles) of an aqueous 49% sodium hydroxide solution was added to the mixture at 70 degrees (Celsius) over a period of one hour. After the completion of the addition, the mixture was further stirred at 100 degrees (Celsius) for three hours. After the completion of the reaction, the reaction mixture was neutralized by adding 10 g of sodium dihydrogen phosphate, and the aqueous layer was then removed. Furthermore, the organic layer was washed with 300 parts of water, and this water washing was repeated three times. Subsequently, methyl isobutyl ketone was removed by heating under reduced pressure. Thus, 626 g of a compound (A-5) was prepared. The resulting compound (A-5) had a softening point of 66 degrees (Celsius) (B & R method), a melt viscosity (measuring method: ICI viscometer method, measuring temperature: 150 degrees (Celsius)) of 0.7 dPa·s, and a hydroxyl equivalent of 189 g/eq.

Example 5

Epoxidation of Phenolic Resin (A-1), Epoxy Resin (E-1)

In a flask equipped with a thermometer, a dropping funnel, a condenser tube, and a stirrer, 276 g (hydroxyl group: 1 equivalent) of the phenolic resin (A-1) prepared in Example 1, 463 g (5.0 moles) of epichlorohydrin, 139 g of n-butanol, and 2 g of tetraethylbenzylammonium chloride were charged and dissolved while nitrogen gas was purged. The temperature was increased to 65 degrees (Celsius), the pressure was then reduced to a pressure at which azeotrope occurs, and 90 g (1.1 moles) of an aqueous 49% sodium hydroxide solution was added dropwise to the solution over a period of five hours. Subsequently, stirring was continued for 0.5 hours under the same condition. During this time, the distillate produced by azeotrope was separated using a Dean-Stark trap and the reaction was conducted while the aqueous layer was removed and the oil layer was returned to the reaction system. Unreacted epichlorohydrin was then distilled off by distillation under reduced pressure. Next, 590 g of methyl isobutyl ketone and 177 g of n-butanol were added to the resulting crude epoxy resin to dissolve the crude epoxy resin in the solvent. Furthermore, 10 g of an aqueous 10% sodium hydroxide solution was added to this solution, and the resulting mixture was allowed to react at 80 degrees (Celsius) for two hours. Subsequently, the reaction mixture was washed with 150 g of water, and this water washing was repeated three times until the pH of the washing liquid became neutral. Next, the reaction system was dehydrated by azeotrope. Microfiltration was conducted, and the solvent was then distilled off under reduced pressure. Thus, 299 g of an epoxy resin (E-1) was prepared. The resulting epoxy resin had a softening point of 62 degrees (Celsius) (B & R method), a melt viscosity (measuring method: ICI viscometer method, measuring temperature: 150 degrees (Celsius)) of 1.2 dPa·s, and an epoxy equivalent of 363 g/eq.

Figure 9:
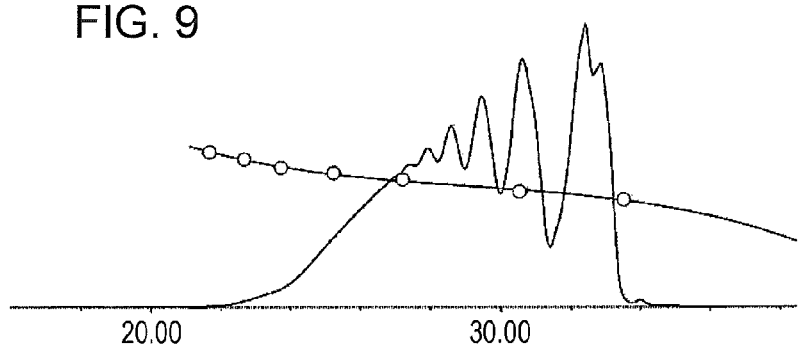
FIG. 9 is a GPC chart of a epoxy resin (E-1) prepared in Example 5.

A GPC chart of the prepared epoxy resin is shown in FIG. 9, a $C^{13}$-NMR chart of the resin is shown in FIG. 10, and a MS spectrum of the resin is shown in FIG. 11. The presence of a naphthylmethyloxy group was confirmed by the above analysis. The ratio of a glycidyloxy group to a naphthylmethyloxy group or an anthrylmethyloxy group was 74:26.

Example 6

Epoxidation of Phenolic Resin (A-2), Epoxy Resin (E-2)

An epoxidized product (E-2) (255 g) was prepared as in Example 5 except that 227 g (hydroxyl group: 1 equivalent) of the phenolic resin (A-2) was used instead of the phenolic resin (A-1). The resulting epoxy resin had a softening point of 61 degrees (Celsius) (B & R method), a melt viscosity (measuring method: ICI viscometer method, measuring temperature: 150 degrees (Celsius)) of 1.2 dPa·s, and an epoxy equivalent of 324 g/eq.

Figure 12:
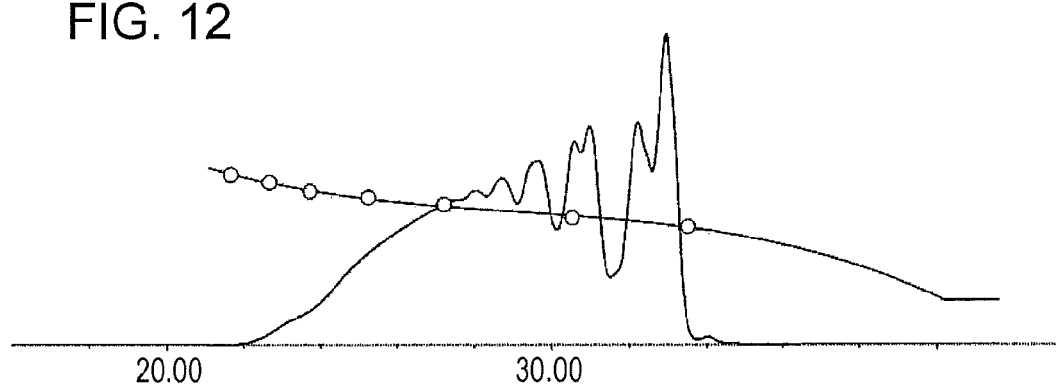
FIG. 12 is a GPC chart of an epoxy resin (E-2) prepared in Example 6.

A GPC chart of the prepared epoxy resin is shown in FIG. 12. The ratio of a glycidyloxy group to a naphthylmethyloxy group or an anthrylmethyloxy group was 84:16.

Example 7

Epoxidation of Phenolic Resin (A-3), Epoxy Resin (E-3)

Figure 13:
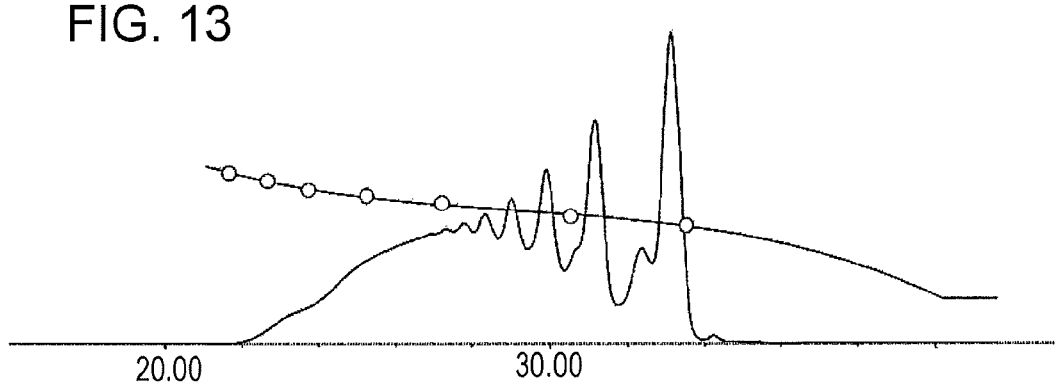
FIG. 13 is a GPC chart of an epoxy resin (E-3) prepared in Example 7.

An epoxidized product (E-3) (226 g) was prepared as in Example 5 except that 195 g (hydroxyl group: 1 equivalent) of the phenolic resin (A-3) was used instead of the phenolic resin (A-1). The resulting epoxy resin had a softening point of 65 degrees (Celsius) (B & R method), a melt viscosity (measuring method: ICI viscometer method, measuring temperature: 150 degrees (Celsius)) of 1.1 dPa·s, and an epoxy equivalent of 285 g/eq. A GPC chart of the prepared epoxy resin is shown in FIG. 13. The ratio of a glycidyloxy group to a naphthylmethyloxy group or an anthrylmethyloxy group was 92:8.

Example 8

Epoxidation of phenolic resin (A-4), Epoxy resin (E-4)

Figure 14:
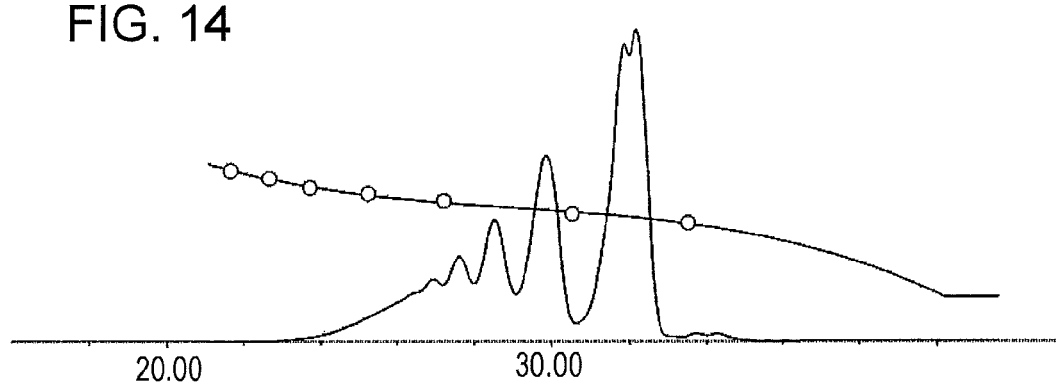
FIG. 14 is a GPC chart of an epoxy resin (E-4) prepared in Example 8.
Figure 15:
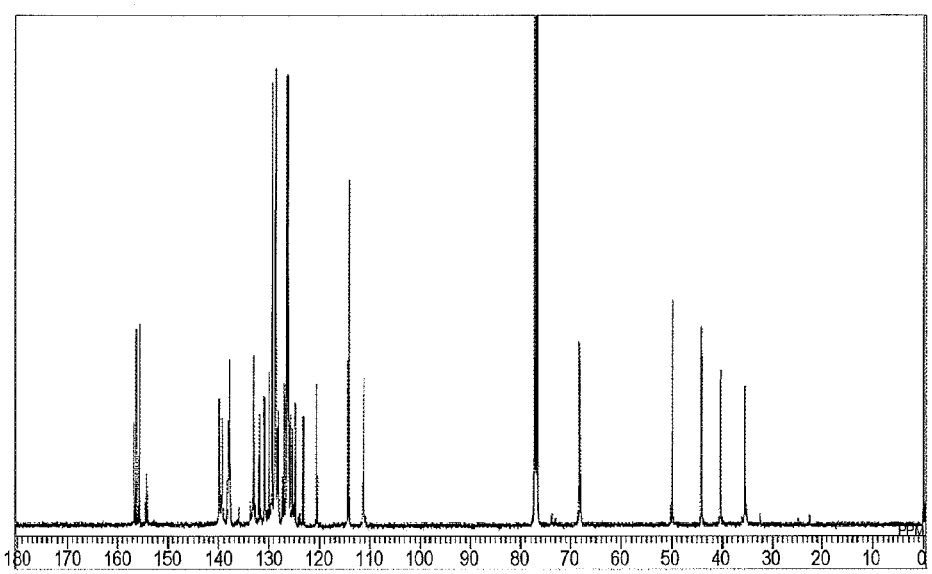
FIG. 15 is a $C^{13}$-NMR chart of the epoxy resin (E-4) prepared in Example 8.
Figure 16:
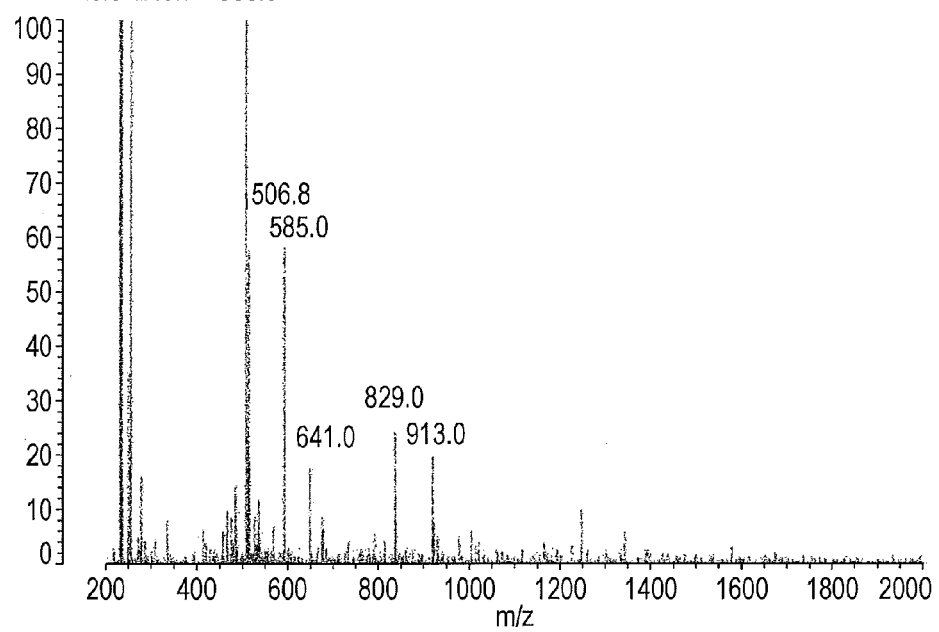
FIG. 16 is a MS spectrum of the epoxy resin (E-4) prepared in Example 8.

An epoxidized product (E-4) (380 g) was prepared as in Example 5 except that 351 g (hydroxyl group: 1 equivalent) of the phenolic resin (A-4) was used instead of the phenolic resin (A-1). The resulting epoxy resin had a softening point of 69 degrees (Celsius) (B & R method), a melt viscosity (measuring method: ICI viscometer method, measuring temperature: 150 degrees (Celsius)) of 1.7 dPa·s, and an epoxy equivalent of 463 g/eq. A GPC chart of the prepared epoxy resin is shown in FIG. 14, a $C^{13}$-NMR chart of the epoxy resin is shown in FIG. 15, and a MS spectrum of the epoxy resin is shown in FIG. 16. The presence of a naphthylmethyloxy group was confirmed by the above analysis. The ratio of a glycidyloxy group to a naphthylmethyloxy group or an anthrylmethyloxy group was 70:30.

Comparative Example 2

Synthesis of epoxy resin (E-5)

Epoxidation was conducted as in Example 5 except that 189 g (hydroxyl group: 1 equivalent) of the phenolic resin (A-5) was used instead of the phenolic resin (A-1). The resulting epoxy resin (E-5) had a softening point of 43 degrees (Celsius) (B & R method), a melt viscosity (measuring method: ICI viscometer method, measuring temperature: 150 degrees (Celsius)) of 0.5 dPa·s, and an epoxy equivalent of 269 g/eq.

Synthesis Example 1

Synthesis of Epoxy Resin (E-6)

In a flask equipped with a thermometer, a condenser tube, a distilling tube, a nitrogen gas-introducing tube, and a stirrer, 432.4 g (4.00 moles) of o-cresol, 158.2 g (1.00 mole) of 2-methoxynaphthalene, and 179.3 g of an aqueous 41 mass % formaldehyde solution (formaldehyde: 2.45 moles) were charged. Next, 9.0 g of oxalic acid was added thereto and the temperature was increased to 100 degrees (Celsius). The reaction mixture was allowed to react at 100 degrees (Celsius) for three hours. Subsequently, 73.2 g of an aqueous 41 mass % formaldehyde solution (formaldehyde: 1.00 mole) was added dropwise to the reaction mixture over a period of one hour while water was collected with the distilling tube. After the completion of the dropwise addition, the temperature was increased to 150 degrees (Celsius) over a period of one hour, and the reaction mixture was further allowed to react at 150 degrees (Celsius) for two hours. After the completion of the reaction, 1,500 g of methyl isobutyl ketone was further added thereto. The resulting mixture was transferred to a separatory funnel and was washed with water. The mixture was then washed with water until the rinse water becomes neutral. Subsequently, unreacted o-cresol and 2-methoxynaphthalene, and methyl isobutyl ketone were removed from the organic layer by heating under reduced pressure. Thus, a phenolic resin was prepared. The resulting phenolic resin had a hydroxyl equivalent of 164 g/eq.

Next, in a flask equipped with a thermometer, a dropping funnel, a condenser tube, and a stirrer, 164 g (hydroxyl group: 1 equivalent) of the phenolic resin obtained above, 463 g (5.0 moles) of epichlorohydrin, 139 g of n-butanol, and 2 g of tetraethylbenzylammonium chloride were charged and dissolved while nitrogen gas was purged. The temperature was increased to 65 degrees (Celsius), the pressure was then reduced to a pressure at which azeotrope occurs, and 90 g (1.1 moles) of an aqueous 49% sodium hydroxide solution was added dropwise to the solution over a period of five hours. Subsequently, stirring was continued for 0.5 hours under the same condition. During this time, the distillate produced by azeotrope was separated using a Dean-Stark trap and the reaction was conducted while the aqueous layer was removed and the oil layer was returned to the reaction system. Unreacted epichlorohydrin was then distilled off by distillation under reduced pressure. Next, 590 g of methyl isobutyl ketone and 177 g of n-butanol were added to the resulting crude epoxy resin to dissolve the crude epoxy resin in the solvent. Furthermore, 10 g of an aqueous 10 mass% sodium hydroxide solution was added to this solution, and the resulting mixture was allowed to react at 80 degrees (Celsius) for two hours. Subsequently, the reaction mixture was washed with 150 g of water, and this water washing was repeated three times until the pH of the washing liquid became neutral. Next, the reaction system was dehydrated by azeotrope. Microfiltration was conducted, and the solvent was then distilled off under reduced pressure. Thus, an epoxy resin (E-6) was prepared. The resulting epoxy resin had a melt viscosity (measuring method: ICI viscometer method, measuring temperature: 150 degrees (Celsius)) of 0.8 dPa·s and an epoxy equivalent of 250 g/eq.

Examples 9 to 18 and Comparative Examples 1 to 3

The epoxy resins (E-1) to (E-6), YX-4000H manufactured by Japan Epoxy Resin Co., Ltd. tetramethylbiphenyl -type epoxy resin, epoxy equivalent: 195 g/eq.), NC-3000 manufactured by Nippon Kayaku Co., Ltd. (biphenyl novolac-type epoxy resin, epoxy equivalent: 274 g/eq.), and NC-2000L manufactured by Nippon Kayaku Co., Ltd. (phenol aralkyl-type epoxy resin, epoxy equivalent: 236 g/eq.), all of which serve as epoxy resins; the phenolic resins (A-1) to (A-5), "XLC-3L" manufactured by Mitsui Chemicals, Inc. (phenol aralkyl resin, hydroxyl equivalent: 172 g/eq.), and "MEH-7851SS" manufactured by Meiwa Plastic Industries, Ltd. (biphenyl novolac resin, hydroxyl equivalent: 200 g/eq.), all of which serve as phenolic resins; triphenylphosphine (TPP) serving as a curing accelerator; magnesium hydroxide (ECO-MAG Z-10, manufactured by Air Water Inc.) and aluminum hydroxide ("CL-303" manufactured by Sumitomo Chemical Co., Ltd.), which serve as flame retardants; spherical silica ("FB-560" manufactured by Denki Kagaku Kogyo Kabushiki Kaisha) serving as an inorganic filler; γ-glycidoxytriethoxysilane ("KBM-403", manufactured by Shin-Etsu Chemical Co., Ltd.) serving as a silane coupling agent; carnauba wax ("PEARL WAX No. 1-P" manufactured by Cerarica Noda Co., Ltd.); and carbon black were blended in accordance with the compositions shown in Tables 1 and 2. Each of the mixtures was then melt-kneaded at a temperature of 85 degrees (Celsius) for five minutes using a two-roll mill to prepare target compositions. The curability of each of the compositions was evaluated. Regarding physical properties of cured products, samples for evaluation were prepared using the above compositions by the method described below, and heat resistance and flame retardancy were measured by the methods described below. The results are shown in Tables 1 and 2.

<Heat Resistance>

Glass transition temperature: The glass transition temperature was measured by using a viscoelasticity measuring apparatus (solid viscoelasticity measuring apparatus RSAII, manufactured by Rheometric Scientific, Inc., double cantilever method; frequency: 1 Hz, temperature-increasing rate: 3 degrees (Celsius)/min).

<Curability>

First, 0.15 g of an epoxy resin composition was placed on a cure plate (manufactured by THERMO ELECTRIC Company, Inc.) heated at 175 degrees (Celsius) and clocking was started using a stop watch. The sample was uniformly stirred by a tip of a bar, and the stop watch was stopped when the sample was separated into threads and left on the plate. The time required for the sample to be separated into threads and left on the plate was defined as a gel time.

<Flame Retardancy>

Samples for evaluation having a width of 12.7 mm, a length of 127 mm, and a thickness of 1.6 mm were each prepared by molding at a temperature of 175 degrees (Celsius) for 90 seconds using a transfer molding machine, and post-curing the molded sample at a temperature of 175 degrees (Celsius) for five hours. The prepared five test specimens having a thickness of 1.6 mm were subjected to a combustion test in accordance with the UL-94 test method.

TABLE 1

|  |  | Example 9 | Example 10 | Example 11 | Example 12 | Example 13 | Example 14 |
|---|---|---|---|---|---|---|---|
| Epoxy resin | E-1 | 89 |  |  |  |  |  |
|  | E-2 |  | 99 |  |  |  |  |
|  | E-3 |  |  | 77 |  |  |  |
|  | E-4 |  |  |  | 107 |  |  |
|  | E-5 |  |  |  |  |  |  |
|  | E-6 |  |  |  |  | 74 |  |
|  | NC-3000 |  |  |  |  |  | 72 |
| Curing agent | A-2 |  |  |  |  |  | 59 |
|  | A-3 |  |  |  |  | 57 |  |
|  | MEH-7851SS |  |  | 54 |  |  |  |
|  | XLC-3L | 42 |  |  |  |  |  |
|  | TD-2131 |  | 32 |  | 24 |  |  |
| Aluminum hydroxide |  |  |  |  |  |  |  |
| Magnesium hydroxide |  |  |  |  |  |  |  |
| TPP |  | 3 | 3 | 3 | 3 | 3 | 3 |
| Fused silica |  | 860 | 860 | 860 | 860 | 860 | 860 |
| Silane coupling agent |  | 2 | 2 | 2 | 2 | 2 | 2 |
| Carnauba wax |  | 1 | 1 | 1 | 1 | 1 | 1 |
| Carbon black |  | 3 | 3 | 3 | 3 | 3 | 3 |
| Curability sec |  | 24 | 32 | 29 | 27 | 28 | 28 |
| Coefficient of thermal expansion (α1) ppm |  | 8.3 | 8.6 | 8.7 | 8.1 | 8.4 | 8.6 |
| Adhesiveness N/cm |  | 210 | 200 | 210 | 180 | 190 | 200 |
| Moisture absorptivity 85%/85RH/300 H % |  | 0.14 | 0.17 | 0.15 | 0.13 | 0.16 | 0.15 |
| Resistance to moisture and solder - |  | Good | Good | Good | Good | Good | Good |
| Flame retardancy Class |  | V-0 | V-0 | V-0 | V-0 | V-0 | V-0 |
| ΣF sec |  | 13 | 19 | 27 | 21 | 25 | 22 |
| Fmax sec |  | 5 | 6 | 7 | 5 | 6 | 6 |

TABLE 2

|  |  | Example 15 | Example 16 | Example 17 | Example 18 | Com. Ex. 1 | Com. Ex. 2 | Com. Ex. 3 |
|---|---|---|---|---|---|---|---|---|
| Epoxy resin | E-2 | 71 |  |  |  |  |  |  |
|  | E-5 |  |  |  |  |  | 80 |  |
|  | E-6 |  |  | 32 | 32 |  |  |  |
|  | YX-4000H |  |  | 32 |  |  |  |  |
|  | N-655-EXP-S |  | 48 |  | 32 | 67 |  | 86 |
| Curing agent | A-1 | 60 |  |  |  |  |  |  |
|  | A-2 |  |  | 67 | 66 |  |  |  |
|  | A-4 |  | 83 |  |  |  |  |  |
|  | A-5 |  |  |  |  | 64 |  |  |
|  | XLC-3L |  |  |  |  |  | 51 |  |
|  | TD-2131 |  |  |  |  |  |  | 45 |
| Aluminum hydroxide |  |  |  |  | 50 |  |  |  |
| Magnesium hydroxide |  |  | 50 |  |  |  |  |  |
| TPP |  | 3 | 3 | 3 | 3 | 3 | 3 | 3 |
| Fused silica |  | 860 | 810 | 810 | 810 | 860 | 860 | 860 |
| Silane coupling agent |  | 2 | 2 | 2 | 2 | 2 | 2 | 2 |
| Carnauba wax |  | 1 | 1 | 1 | 1 | 1 | 1 | 1 |
| Carbon black |  | 3 | 3 | 3 | 3 | 3 | 3 | 3 |
| Curability sec |  | 31 | 34 | 31 | 29 | 34 | 24 | 31 |
| Coefficient of thermal expansion ($\alpha1$) ppm |  | 8.0 | 8.4 | 8.4 | 8.6 | 9.2 | 9.2 | 9.0 |
| Adhesiveness N/cm |  | 230 | 210 | 190 | 180 | 150 | 150 | 90 |
| Moisture absorptivity 85%/85RH % |  | 0.12 | 0.13 | 0.16 | 0.16 | 0.19 | 0.17 | 0.24 |
| Resistance to moisture and solder - |  | Good | Good | Good | Good | Poor | Poor | Poor |
| Flame retardancy Class |  | V-0 | V-0 | V-0 | V-0 | V-1 | V-1 | Burning |
| ΣF sec |  | 11 | 15 | 12 | 29 | 51 | 54 | — |
| Fmax sec |  | 3 | 4 | 4 | 9 | 11 | 12 | — |

Com. Ex.: Comparative Example
Abbreviations in Tables 1 and 2 represent the following:
NC-2000L: phenol aralkyl-type epoxy resin ("NC-2000L" manufactured by Nippon Kayaku Co., Ltd., epoxy equivalent: 236 g/eq.)
NC-3000: biphenyl novolac-type epoxy resin ("NC-3000" manufactured by Nippon Kayaku Co., Ltd., epoxy equivalent: 274 g/eq.)
YX-4000H: tetramethylbiphenyl-type epoxy resin, "YX-4000H" manufactured by Japan Epoxy Resin Co., Ltd., epoxy equivalent: 195 g/eq.)
N-655-EXP-S: cresol novolac-type epoxy resin ("Epiclon N-655-EXP-S", epoxy equivalent: 200 g/eq.)
MEH-7851SS: biphenyl novolac resin ("MEH-7851SS" manufactured by Meiwa Plastic Industries, Ltd., hydroxyl equivalent: 200 g/eq.)
XLC-3L: phenol aralkyl resin ("XLC-3L" manufactured by Mitsui Chemicals, Inc., hydroxyl equivalent: 172 g/eq.)
TD-2131: phenol novolac-type phenolic resin ("TD-2131" manufactured by DIC Corporation, hydroxyl equivalent: 104 g/eq.)
TPP: triphenylphosphine

The invention claimed is:

1. A thermosetting resin composition comprising an epoxy resin (A) and a phenolic resin (B) as essential components; wherein the phenolic resin (B) has a structure comprising structural moieties (ph1), (ph2), and (X); wherein structural moiety (ph1) is an aromatic group comprising an aromatic skeleton and either a naphthylmethyloxy group or an anthrylmethyloxy group directly bonded to the aromatic skeleton via the oxygen atom of the naphthylmethyloxy group or the anthrylmethyloxy group; wherein structural moiety (ph2) is an aromatic group comprising an aromatic skeleton and at least one hydroxyl group directly bonded to the aromatic skeleton; wherein structural moiety (X) is represented by the following general formula 1:

General formula 1

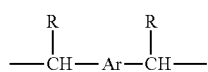

(where Ar represents a phenylene group or a biphenylene group and each R independently represents a hydrogen atom or a methyl group); wherein each structural moiety (ph1) in the structure of the phenolic resin (B) is directly bonded to a structural moiety (X) via the aromatic skeleton of (ph1); and wherein each structural moiety (ph2) in the structure of the phenolic resin (B) is directly bonded to a structural moiety (X) via the aromatic skeleton of (ph2).

2. The thermosetting resin composition according to claim 1, wherein the phenolic resin (B) has a melt viscosity of 0.1 to 100 dPa·s measured at 150° C. with an ICI viscometer.

3. A semiconductor sealing material comprising the thermosetting resin composition according to claim 2 and an inorganic filler in an amount of 70% to 95% by mass of the semiconductor sealing material.

4. A cured product obtained by curing the thermosetting resin composition according to claim 2.

5. A semiconductor sealing material comprising the thermosetting resin composition according to claim 1 and an inorganic filler in an amount of 70% to 95% by mass of the semiconductor sealing material.

6. A cured product obtained by curing the thermosetting resin composition according to claim 1.

7. A phenolic resin having a structure comprising structural moieties (ph1), (ph2), and (X); wherein structural moiety (ph1) is an aromatic group comprising an aromatic skeleton and either a naphthylmethyloxy group or an anthrylmethyloxy group directly bonded to the aromatic skeleton via the oxygen atom of the naphthylmethyloxy group or the anthrylmethyloxy group; wherein structural moiety (ph2) is an aromatic group comprising an aromatic skeleton and at least one hydroxyl group directly bonded to the aromatic skeleton;

wherein structural moiety (X) is represented by the following general formula 1:

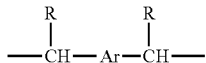

General formula 1

(where Ar represents a phenylene group or a biphenylene group and each R independently represents a hydrogen atom or a methyl group);wherein each structural moiety (ph1) in the structure of the phenolic resin is directly bonded to a structural moiety (X) via the aromatic skeleton of (ph1); and wherein each structural moiety (ph2) in the structure of the phenolic resin is directly bonded to a structural moiety (X) via the aromatic skeleton of (ph2).

8. The phenolic resin according to claim 7, wherein a melt viscosity measured at 150° C. with an ICI viscometer is 0.1 to 100 dPa·s.

9. A thermosetting resin composition comprising an epoxy resin (A') and a curing agent (B') as essential components, wherein the epoxy resin (A') has a structure comprising structural moieties (ph1), (ep), and (X); wherein structural moiety (ph1) is an aromatic group comprising an aromatic skeleton and either a naphthylmethyloxy group or an anthrylmethyloxy group directly bonded to the aromatic skeleton via the oxygen atom of the naphthylmethyloxy group or the anthrylmethyloxy group; wherein the structural moiety (ep) is an aromatic group comprising an aromatic skeleton and at least one glycidyloxy group directly bonded to the aromatic skeleton; wherein structural moiety (X) is represented by the following general formula 1:

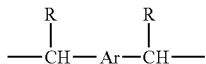

General formula 1

(where Ar represents a phenylene group or a biphenylene group and each R independently represents a hydrogen atom or a methyl group) ; wherein each structural moiety (ph1) in the structure of the epoxy resin (A') is directly bonded to a structural moiety (X) via the aromatic skeleton of (ph1); and wherein each structural moiety (ep) in the structure of the epoxy resin (A') is directly bonded to a structural moiety (X) via the aromatic skeleton of (ep).

10. The thermosetting resin composition according to claim 9, wherein the epoxy resin (A') has a melt viscosity of 0.1 to 100 dPa·s measured at 150° C. with an ICI viscometer.

11. A semiconductor sealing material comprising the thermosetting resin composition according to claim 10 and an inorganic filler in an amount of 70% to 95% by mass of the semiconductor sealing material.

12. A cured product obtained by curing the thermosetting resin composition according to claim 10.

13. A semiconductor sealing material comprising the thermosetting resin composition agent according to claim 9 and an inorganic filler in an amount of 70% to 95% by mass of the semiconductor sealing material.

14. A cured product obtained by curing the thermosetting resin composition according to claim 9.

15. An epoxy resin having a structure comprising structural moieties (ph1), (ep), and (X); wherein structural moiety (ph1) is an aromatic group comprising an aromatic skeleton and either a naphthylmethyloxy group or an anthrylmethyloxy group directly bonded to the aromatic skeleton via the oxygen atom of the naphthylmethyloxy group or the anthrylmethyloxy group; wherein the structural moiety (ep) is an aromatic group comprising an aromatic skeleton and at least one glycidyloxy group directly bonded to the aromatic skeleton; wherein structural moiety (X) is represented by the following general formula 1:

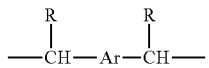

General formula 1

(where Ar represents a phenylene group or a biphenylene group and each R independently represents a hydrogen atom or a methyl group); wherein each structural moiety (ph1) in the structure of the epoxy resin is directly bonded to a structural moiety (X) via the aromatic skeleton of (ph1); and wherein each structural moiety (ep) in the structure of the epoxy resin is directly bonded to a structural moiety (X) via the aromatic skeleton of (ep).

16. The epoxy resin according to claim 15, wherein the epoxy resin has a melt viscosity of 0.1 to 100 dPa·s measured at 150° C. with an ICI viscometer.

* * * * *